(12) United States Patent
Gao et al.

(10) Patent No.: US 12,408,160 B2
(45) Date of Patent: Sep. 2, 2025

(54) SCHEDULING METHOD UTILIZING INDICATION SIGNALING AND SCHEDULING SIGNALING

(71) Applicant: HUAWEI TECHNOLOGIES CO., LTD., Shenzhen (CN)

(72) Inventors: Lei Gao, Beijing (CN); Sha Ma, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 357 days.

(21) Appl. No.: 17/976,507

(22) Filed: Oct. 28, 2022

(65) Prior Publication Data

US 2023/0049465 A1  Feb. 16, 2023

Related U.S. Application Data

(63) Continuation of application No. PCT/CN2020/087922, filed on Apr. 29, 2020.

(51) Int. Cl.
*H04W 72/1263* (2023.01)
*H04L 5/00* (2006.01)

(52) U.S. Cl.
CPC ....... *H04W 72/1263* (2013.01); *H04L 5/0048* (2013.01)

(58) Field of Classification Search
CPC ............. H04W 72/1263; H04W 72/23; H04W 72/0446; H04W 72/04; H04W 72/0453; H04W 72/1268; H04L 5/0048
See application file for complete search history.

(56) References Cited

U.S. PATENT DOCUMENTS

| | | | | |
|---|---|---|---|---|
| 8,971,266 | B2 * | 3/2015 | Wang | H04W 52/04 |
| | | | | 370/329 |
| 2009/0279493 | A1 * | 11/2009 | Gaal | H04L 5/0007 |
| | | | | 370/329 |
| 2018/0092070 | A1 | 3/2018 | Liao et al. | |
| 2019/0037597 | A1 | 1/2019 | Lee et al. | |

(Continued)

FOREIGN PATENT DOCUMENTS

| | | |
|---|---|---|
| CN | 102595624 A | 7/2012 |
| CN | 103209487 A | 7/2013 |
| CN | 104349355 A | 2/2015 |

(Continued)

*Primary Examiner* — Chandrahas B Patel
(74) *Attorney, Agent, or Firm* — Leydig, Voit & Mayer, Ltd.

(57) ABSTRACT

This application relates to a scheduling method, an apparatus, and a system. A first communications apparatus sends first signaling on a first resource, where the first signaling is used to indicate N communications apparatuses. The first communications apparatus sends second signaling on a second resource, where the second signaling is used to schedule the N communications apparatuses to send or receive first data, and the first resource has an association relationship with the second resource. In addition, the first resource has the association relationship with the second resource. In this case, a receive end of the first signaling and the second signaling may determine the second resource after determining the first resource, so that the second signaling is only detected on the second resource, and blind detection does not need to be performed on too many resources.

20 Claims, 5 Drawing Sheets

(56) References Cited

U.S. PATENT DOCUMENTS

2019/0312679 A1    10/2019  Jayasinghe et al.
2020/0359407 A1    11/2020  Takeda et al.

FOREIGN PATENT DOCUMENTS

| CN | 106304360 A | 1/2017 |
| CN | 110149711 A | 8/2019 |
| CN | 110830220 A | 2/2020 |
| CN | 110855411 A | 2/2020 |
| CN | 110876193 A | 3/2020 |
| WO | 2009022294 A2 | 2/2009 |
| WO | 2019138499 A1 | 7/2019 |

* cited by examiner

SCHEDULING METHOD UTILIZING INDICATION SIGNALING AND SCHEDULING SIGNALING

CROSS-REFERENCE TO RELATED APPLICATIONS

This application is a continuation of International Application No. PCT/CN2020/087922, filed on Apr. 29, 2020, the disclosure of which is hereby incorporated by reference in its entirety.

TECHNICAL FIELD

This application relates to the field of mobile communications technologies, and in particular, to a scheduling method, an apparatus, and a system.

BACKGROUND

Due to diversified in-vehicle applications, there are increasingly more in-vehicle communication nodes and increasingly more types of the in-vehicle communication nodes, which imposes higher requirements on in-vehicle communication capabilities. Usually, an in-vehicle communication link may include a plurality of communication domains. One communication domain includes one master node and at least one slave node. The master node schedules the slave node, to transmit service data between the master node and the slave node.

Conventionally, in a communication domain, a master node may send scheduling signaling, to schedule a slave node to transmit service data. A group of fixed resources are configured for each slave node to receive scheduling signaling. When scheduling the slave node, the master node selects a resource from the group of resources to send the scheduling signaling, and the slave node blindly detects the scheduling signaling on each resource in the group of resources. The scheduling signaling may indicate information such as a scheduled resource of transmission data, a modulation and coding scheme (MCS) of the transmission data, a type of the transmission data, and power control.

It will be appreciated that the scheduling signaling includes a large amount of content and a large information amount. Generally, when a same quantity of resources are used, more transmitted information indicates lower transmission reliability. It will be appreciated that conventionally, because the scheduling signaling includes the large amount of content, transmission reliability of the scheduling signaling is low.

SUMMARY

Embodiments of this application provide a scheduling method, an apparatus, and a system, to improve transmission reliability of scheduling signaling.

According to a first aspect, a first scheduling method is provided. The method includes: A first communications apparatus sends first signaling on a first resource, where the first signaling is used to indicate N communications apparatuses, and N is an integer greater than or equal to 1. The first communications apparatus sends second signaling on a second resource, where the second signaling is used to schedule the N communications apparatuses to send or receive first data, and the first resource has an association relationship with the second resource.

The method may be performed by the first communications apparatus. The first communications apparatus may be a communications device or a communications apparatus, for example, a chip, that can support the communications device in implementing a function for the method. For example, the first communications apparatus is a terminal apparatus. The terminal apparatus is a terminal device, a chip that is disposed in the terminal device and that is configured to implement functions of the terminal device, or another component configured to implement functions of the terminal device.

In this embodiment of this application, a two-level scheduling manner may be implemented. The first signaling needs to only indicate a corresponding communications apparatus, and does not need to include too much information, so that an information amount of the first signaling is small. In addition, because the first signaling has indicated the corresponding communications apparatus, the second signaling does not need to indicate the communications apparatus any more. It will be appreciated that, as scheduling signaling, information amounts of the first signaling and the second signaling are both reduced, to improve transmission reliability of the scheduling signaling. When the communications apparatuses perform blind detection, because the information amount of the first signaling is small, a blind detection amount is also small. After detecting the first signaling, a communications apparatus may determine whether the communications apparatus is scheduled, so that unscheduled communications apparatuses do not need to detect the second signaling any more, to reduce invalid blind detection of these unscheduled communications apparatuses. In addition, the first resource has the association relationship with the second resource. In this case, a receive end (for example, a second communications apparatus) of the first signaling and the second signaling may determine the second resource after determining the first resource, so that the second signaling is only detected on the second resource, and blind detection does not need to be performed on too many resources. This can further reduce the blind detection amount of the communications apparatus, and simplify implementation complexity of the communications apparatus.

In an optional implementation, the method further includes the following steps:

The first communications apparatus sends third signaling on a third resource, where the third signaling is used to indicate M communications apparatuses, and M is an integer greater than or equal to 1.

The first communications apparatus sends a first signal on a fourth resource, where the first signal includes at least one of second data, first higher layer signaling, or a reference signal, the third resource and the first resource belong to a first group of resources, the second resource and the fourth resource belong to a second group of resources, resources included in the first group of resources are in one-to-one association with resources included in the second group of resources, and the third resource has an association relationship with the fourth resource.

A dynamic service, higher layer signaling, a reference signal, or the like may occur randomly and has no obvious periodicity. If the two-level scheduling mode described above is used, there may be a large amount of scheduling signaling. Therefore, in this embodiment of this application, for the dynamic service (for example, a service corresponding to the first data is the dynamic service), the higher layer signaling, the reference signal, or the like, a one-level scheduling mode may be used. The third signaling may be used as scheduling signaling. After sending the scheduling signaling, the first communications apparatus may send the dynamic service, the first higher layer signaling, or the reference signal scheduled by using the scheduling signaling. The one-level scheduling manner helps reduce an amount of scheduling signaling and reduce signaling overheads. The scheduling signaling needs to only indicate a corresponding communications apparatus, and does not need to indicate too much content, so that an information amount of the scheduling signaling is small. Even if all communications apparatuses in a first communication domain need to blindly detect the scheduling signaling, because the information amount is small, a blind detection amount is also small. When the dynamic service, the higher layer signaling, or the reference signal is scheduled, although the one-level scheduling mode is used, a scheduling process is similar to a two-level scheduling process. For example, a resource may be selected from the first group of resources to send the scheduling signaling, and a corresponding resource may be selected from the second group of resources to send the first signal, so that the one-level scheduling process and the two-level scheduling process are unified, to simplify an overall data scheduling procedure. In addition, the dynamic service, the higher layer signaling, or the reference signal may multiplex a resource with second-level scheduling signaling (this means that the second group of resources may be used), to improve resource utilization.

In an optional implementation, the method further includes: The first communications apparatus receives first feedback information from a second communications apparatus in the N communications apparatuses, where the first feedback information is used to indicate that the first signal is successfully received or fails to be received.

After receiving the first signal, each of some or all of the N communications apparatuses may send feedback information, for example, referred to as the first feedback information, to the first communications apparatus. In this case, the first communications apparatus may receive the first feedback information from each of some or all of the N communications apparatuses, where the first feedback information may indicate that the first signal is successfully received or fails to be received. For example, if the second communications apparatus sends the first feedback information to the first communications apparatus, the first communications apparatus may receive the first feedback information from the second communications apparatus. For example, the first feedback information is a physical layer feedback, for example, an ACK or a NACK, or the first feedback information may be a higher layer feedback. A type of the feedback information is not limited.

In an optional implementation, the reference signal is used to implement one or more of the following functions:
time synchronization;
frequency synchronization;
phase tracking;
channel quality detection;
channel estimation; or
interference measurement.

For example, the reference signal may be used to implement a time synchronization function; or the reference signal may be used to implement a frequency synchronization function; or the reference signal may be used to implement a phase tracking function; or the reference signal may be used to implement a channel quality detection function; or the reference signal may be used to implement a channel estimation function; or the reference signal may be used to implement an interference measurement function; or the reference signal may be used to implement a channel quality detection function and a channel estimation function. Alternatively, the reference signal may be used to implement another function. A function that can be implemented by using the reference signal is not limited in this embodiment of this application. The function that can be implemented by using the reference signal herein is a function that can be implemented by the second communications apparatus by using the reference signal (for example, by measuring the reference signal).

In an optional implementation, details are as follows:
The association relationship between the first resource and the second resource is pre-configured.

Alternatively, the method further includes: The first communications apparatus sends fourth signaling, where the fourth signaling is used to indicate the association relationship between the first resource and the second resource.

In this embodiment of this application, the first group of resources and the second group of resources may be preset for the first communication domain. The first group of resources include at least one resource, the second group of resources also include at least one resource, and the resource included in the first group of resources has an association relationship with the resource included in the second group of resources. For example, the first resource belongs to the first group of resources, the second resource belongs to the second group of resources, and the first resource has an association relationship with the second resource. The first group of resources, the second group of resources, the association relationship between the resources, and the like may be specified in a protocol, or may be pre-configured in a communications apparatus (for example, all or some communications apparatuses included in the first communication domain). To pre-configure corresponding information in a communications apparatus, the corresponding information may be configured in the communications apparatus when the communications apparatus is delivered from a factory, repaired, or maintained, or may be set by the first communications apparatus. If the corresponding information is set by the first communications apparatus, for example, the first communications apparatus may determine, based on performance of the first communications apparatus (for example, information processing time of the first communications apparatus), which two resources may have an association relationship, and after the setting, the first communications apparatus may send signaling to a communications apparatus other than the first communications apparatus in the first communication domain, to indicate the association relationship between the first group of resources and the second group of resources.

In an optional implementation, that the first signaling indicates N communications apparatuses includes:
The first signaling includes identifiers of the N communications apparatuses.

Alternatively, scrambling codes used to scramble the first signaling are first scrambling codes, and the first scrambling codes correspond to the N communications apparatuses.

The first signaling may implicitly or explicitly indicate the N communications apparatuses. For example, in an implicit indication manner, different scrambling codes used to scramble the first signaling indicate different communications apparatuses. For example, the scrambling codes used to scramble the first signaling are the first scrambling codes, and the first scrambling codes correspond to the N communications apparatuses. Therefore, the first signaling can indicate the N communications apparatuses. For example, a scrambling code 1 corresponds to a communications apparatus 1, and a scrambling code 2 corresponds to a communications apparatus 2. In this case, if a scrambling code used to scramble the first signaling is the scrambling code 1, it indicates that the communications apparatus 1 is indicated. If a scrambling code used to scramble the first signaling is the scrambling code 2, it indicates that the communications apparatus 2 is indicated. In this case, if a communications apparatus successfully detects the first signaling by using the scrambling code 1, the communications apparatus may determine that the first signaling indicates the communications apparatus 1, and if the communications apparatus successfully detects the first signaling by using the scrambling code 2, the communications apparatus may determine that the first signaling indicates the communications apparatus 2. The N communications apparatuses are implicitly indicated, and the first signaling does not need to carry additional information to indicate the N communications apparatuses. This helps reduce overheads of the first signaling and reduce blind detection amounts of the N communications apparatuses. In addition, generally, when a same quantity of resources are used, less transmitted information indicates higher transmission reliability. In this case, because the first signaling does not need to carry the additional information to indicate the N communications apparatuses, that is, little information is transmitted by using the same quantity of resources, transmission reliability of the first signaling can be improved.

Alternatively, the first signaling may explicitly indicate the N communications apparatuses. For example, in an explicit indication manner, if the first signaling includes an identifier of a communications apparatus, it indicates that the communications apparatus is indicated. For example, if the first signaling includes the identifiers of the N communications apparatuses, it indicates that the N communications apparatuses are indicated. The identifier of the communications apparatus in this embodiment of this application is, for example, an ID of the communications apparatus, or may be an address of the communications apparatus in the first communication domain, or may be an identifier of a communications apparatus group to which the communications apparatus belongs. One communications apparatus group corresponds to one identifier, and one communications apparatus group may include one or more communications apparatuses. The first signaling implicitly indicates a communications apparatus. In this case, if a communications apparatus in the first communication domain fails to detect the first signaling, the communications apparatus may fail to determine whether the detection fails because the communications apparatus is not scheduled or because of a detection process. As a result, the communications apparatus may fail to determine whether to continue to detect the subsequent second signaling. This problem can be avoided in the explicit indication manner. All the communications apparatus may blindly detect the first signaling. If the first signaling includes an identifier of a communications apparatus, the communications apparatus may determine that the communications apparatus is scheduled. If the first signaling does not include an identifier of a communications apparatus, the communications apparatus may determine that the communications apparatus is not scheduled. Therefore, subsequent processing logic of the communications apparatus is clearer.

In an optional implementation, the first signaling is physical layer signaling.

A function of the first signaling is to enable a corresponding communications apparatus to know that the communications apparatus is scheduled. For example, if the first signaling indicates the N communications apparatuses, it indicates that the N communications apparatuses are scheduled. A processing procedure of the physical layer signaling is short, and therefore a processing speed is fast. Therefore, if the first signaling is the physical layer signaling, a corresponding communications apparatus can quickly determine whether the communications apparatus is scheduled. Alternatively, the first signaling may be other signaling, for example, higher layer signaling. This is not limited in this embodiment of this application.

In an optional implementation, the second signaling is high layer signaling.

In a two-level scheduling process, because the first data needs to be scheduled by using the second signaling, the second signaling may include a large amount of content and is complex. Therefore, optionally, the second signaling is, for example, the higher layer signaling, for example, RRC signaling or a MAC CE. The higher layer signaling has a large capacity, and may include a large amount of information. Alternatively, the second signaling may be other signaling, for example, physical layer signaling. This is not limited in this embodiment of this application.

In an optional implementation, the second signaling further includes type information of the second signaling and/or data amount information of the second signaling.

The type information of the second signaling and/or the data amount information of the second signaling may be included in the second signaling. In this manner, a data amount of the first signaling can be reduced, so that an amount of blind detection performed by the communications apparatus on the first signaling is further reduced.

In an optional implementation, the first signaling further includes one or more types of the following information:

an MCS of the second signaling;
type information of the second signaling;
priority information of the second signaling; or
data amount information of the second signaling.

The MCS of the second signaling is a modulation and coding scheme of the second signaling, and may include a modulation scheme of the second signaling, or include a coding scheme of the second signaling, or include a modulation scheme and a coding scheme of the second signaling. If the first signaling includes the MCS of the second signaling, the N communications apparatuses only receive the second signaling according to the MCS, and do not need to blindly detect the second signaling by using a plurality of MCSs, to reduce blind detection amounts of the N communications apparatuses. If the first signaling includes the type information of the second signaling, the N communications apparatuses do not need to parse the second signaling in a blind detection manner, but may directly parse the second signaling. This reduces blind detection amounts of the N communications apparatuses. A type of the second signaling indicates, for example, one or more types of the following information: a specific type of the second signaling (for example, scheduling signaling, carrier switching signaling, or signaling used to indicate to report channel information), a scheduling type (for example, a semi-persistent scheduling type or a dynamic scheduling type) of the second signaling, or a priority of the second signaling. If the type of the second signaling indicates only the priority of the second signaling (or the type information of the second signaling includes only the priority information of the second signaling), the type information of the second signaling and the priority information of the second signaling may be considered as same information. In this case, the information may be referred to as the type information of the second signaling, or may be referred to as the priority information of the second signaling. If the first signaling includes the data amount information of the second signaling, the N communications apparatuses do not need to parse the second signaling in a blind detection manner, but may directly parse the second signaling. This also reduces blind detection amounts of the N communications apparatuses.

In an optional implementation, the first data is scheduled in a semi-persistent scheduling manner.

For example, the first data corresponds to a first service. For example, the first data may also be referred to as first service data. The first service may be a dynamic service, or may be a non-dynamic service. If the first service is the non-dynamic service, a scheduling manner of the first service is, for example, a semi-persistent scheduling manner. If the first data corresponds to the first service, the first data may be scheduled in the semi-persistent scheduling manner. For example, if the type information of the second signaling further indicates the scheduling type of the second signaling, the scheduling type of the second signaling may be a semi-persistent scheduling type. Alternatively, although the first service is the non-dynamic service, the first service may be scheduled in another scheduling manner instead of the semi-persistent scheduling manner. Alternatively, if the first service is the dynamic service, the first service may also be scheduled in another scheduling manner instead of the semi-persistent scheduling manner. In this case, the first data is not scheduled in the semi-persistent scheduling manner. A scheduling manner of the first data is not limited in this embodiment of this application.

For example, the first data is only a non-dynamic service, and is scheduled only in a semi-persistent scheduling manner, and a dynamic service (for example, the first signal may correspond to a dynamic service) is scheduled in the one-level scheduling mode described above. In this way, a type of the second signaling can be reduced, and scheduling signaling (for example, the second signaling) can be simplified. In addition, because a resource that can be used to transmit the first data is scheduled only in the semi-persistent scheduling manner, fragmentation of the resource that can be used to transmit the first data can also be avoided.

In an optional implementation, the second signaling includes one or more types of the following information:
time domain resource information and/or frequency domain resource information used to send or receive the first data;
an MCS of the first data;
type information of the first data; or
power control information used to send the first data.

The second signaling may indicate a resource, an MCS, or the like of the first data, so that the N communications apparatuses can correctly receive or send the first data. Certainly, the second signaling may further indicate other information related to the first data. This is not specifically limited.

In an optional implementation, the method further includes the following step:

The first communications apparatus sends or receives the first data.

If the second signaling is used to schedule the N communications apparatuses to receive the first data from the first communications apparatus, after sending the second signaling, the first communications apparatus may further send the first data to the N communications apparatuses based on the second signaling, and the N communications apparatuses may receive the first data from the first communications apparatus based on the second signaling. Alternatively, if the second signaling is used to schedule the N communications apparatuses to send the first data to the first communications apparatus, after receiving the second signaling, the N communications apparatuses may further send the first data to the first communications apparatus based on the second signaling, and the first communications apparatus may receive the first data from each of the N communications apparatuses based on the second signaling.

In an optional implementation, the method further includes the following step:

The first communications apparatus receives second feedback information from the second communications apparatus in the N communications apparatuses, where the second feedback information is used to indicate that the second signaling is successfully received or fails to be received.

After the N communications apparatuses receive the second signaling, each of some or all of the N communications apparatuses may send feedback information, for example, referred to as the second feedback information, to the first communications apparatus. In this case, the first communications apparatus may receive the second feedback information from each of some or all of the N communications apparatuses, where the second feedback information may indicate that the second signaling is successfully received or fails to be received. For example, if the second communications apparatus sends the second feedback information to the first communications apparatus, the first communications apparatus may receive the second feedback information from the second communications apparatus. For example, the second feedback information is a physical layer feedback, for example, an ACK or a NACK, or the second feedback information may be a higher layer feedback. A type of the feedback information is not limited.

In an optional implementation, the method further includes the following step:

The first communications apparatus sends fifth signaling on a fifth resource, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

If a communications apparatus receives the fifth signaling, the communications apparatus may determine that the communications apparatus is still in a range of the first communication domain. In this sense, the fifth signaling may be considered as heartbeat information, so that the communications apparatus can determine whether the communications apparatus moves out of the range of the communication domain, and the communications apparatus can take a corresponding countermeasure. For example, for a network architecture shown in FIG. 7A, a mobile phone may be used as a slave node in a communication domain 2, and the mobile phone is held by a user and may move. For example, a master node CDC in the communication domain 2 periodically sends the fifth signaling. If the mobile phone does not detect the fifth signaling in a period or several periods, the mobile phone may determine that the mobile phone has moved out of a range of the communication domain 2. In this case, the mobile phone may re-establish a connection to the communication domain 2, or choose to establish a connection to another communication domain, or the like.

In an optional implementation, that the fifth signaling is used to indicate not to schedule any communications apparatus to receive a signal on a sixth resource includes:

The fifth signaling includes a first identifier, and the first identifier is not an identifier of any communications apparatus or communications apparatus group.

The first identifier is, for example, an identifier of a communications apparatus, for example, an ID of the communications apparatus. However, the first identifier may be a default identifier, or the first identifier is a reserved identifier. This may mean that the communications apparatus indicated by the first identifier does not exist, or does not exist in at least the first communication domain. Alternatively, the first identifier is, for example, an identifier of a communications apparatus group, for example, an ID of the communications apparatus group. However, the first identifier may be a default identifier, or the first identifier is a reserved identifier. This may mean that the communications apparatus group indicated by the first identifier does not exist, or does not exist in at least the first communication domain. Therefore, a communications apparatus that receives the fifth signaling may determine that the fifth signaling indicates not to schedule any communications apparatus or communications apparatus group to receive a signal on the sixth resource, or may determine that the fifth signaling indicates not to schedule the communications apparatus to receive a signal on the sixth resource.

According to a second aspect, a second scheduling method is provided. The method includes: A second communications apparatus receives first signaling on a first resource, where the first signaling is used to indicate N communications apparatuses, and N is an integer greater than or equal to 1. The second communications apparatus determines that the N communications apparatuses include the second communications apparatus, and receives second signaling on a second resource that has an association relationship with the first resource, where the second signaling is used to schedule the N communications apparatuses to send or receive first data.

The method may be performed by the second communications apparatus. The second communications apparatus may be a communications device or a communications apparatus, for example, a chip, that can support the communications device in implementing a function for the method. For example, the second communications apparatus is a terminal apparatus. The terminal apparatus is a terminal device, a chip that is disposed in the terminal device and that is configured to implement functions of the terminal device, or another component configured to implement functions of the terminal device.

In an optional implementation, the method further includes the following steps:

The second communications apparatus receives third signaling on a third resource, where the third signaling is used to indicate M communications apparatuses, and M is an integer greater than or equal to 1.

The second communications apparatus determines that the M communications apparatuses include the second communications apparatus, and receives a first signal on a fourth resource that has an association relationship with the third resource, where the first signal includes at least one of second data, first higher layer signaling, or a reference signal, the third resource and the first resource belong to a first group of resources, the second resource and the fourth resource belong to a second group of resources, and resources included in the first group of resources are in one-to-one association with resources included in the second group of resources.

In an optional implementation, the method further includes: The second communications apparatus sends first feedback information to a first communications apparatus, where the first feedback information is used to indicate that the first signal is successfully received or fails to be received.

In an optional implementation, the reference signal is used to implement one or more of the following functions:
time synchronization;
frequency synchronization;
phase tracking;
channel quality detection;
channel estimation; or
interference measurements In an optional implementation, details are as follows:

The association relationship between the first resource and the second resource is pre-configured.

Alternatively, the method further includes: The second communications apparatus receives fourth signaling, where the fourth signaling is used to indicate the association relationship between the first resource and the second resource.

In an optional implementation, that the first signaling indicates N communications apparatuses includes:

The first signaling includes identifiers of the N communications apparatuses.

Alternatively, scrambling codes used to scramble the first signaling are first scrambling codes, and the first scrambling codes correspond to the N communications apparatuses.

In an optional implementation, the first signaling is physical layer signaling.

In an optional implementation, the second signaling is high layer signaling.

In an optional implementation, the second signaling further includes type information of the second signaling and/or data amount information of the second signaling.

In an optional implementation, the first signaling further includes one or more types of the following information:
an MCS of the second signaling;
type information of the second signaling;
priority information of the second signaling; or
data amount information of the second signaling.

In an optional implementation, the first data is scheduled in a semi-persistent scheduling manner.

In an optional implementation, the second signaling includes one or more types of the following information:
time domain resource information and/or frequency domain resource information used to send or receive the first data;
an MCS of the first data;
type information of the first data; or
power control information used to send the first data.

In an optional implementation, the method further includes the following step:

The second communications apparatus sends or receives the first data.

In an optional implementation, the method further includes the following step:

The second communications apparatus sends second feedback information to the first communications apparatus, where the second feedback information is used to indicate that the second signaling is successfully received or fails to be received.

In an optional implementation, the method further includes the following steps:

The second communications apparatus receives fifth signaling on a fifth resource, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

The second communications apparatus skips performing detection on the sixth resource that has the association relationship with the fifth resource.

In an optional implementation, that the fifth signaling is used to indicate not to schedule any communications apparatus to receive a signal on a sixth resource includes:

The fifth signaling includes a first identifier, and the first identifier is not used to indicate any communications apparatus or communications apparatus group.

For technical effects brought by the second aspect or some optional implementations of the second aspect, refer to descriptions of technical effects brought by the first aspect or the corresponding implementations.

According to a third aspect, a communications apparatus is provided. For example, the communications apparatus is the first communications apparatus described above. The first communications apparatus is configured to perform the method according to any one of the first aspect or the possible implementations. Specifically, the first communications apparatus may include modules configured to perform the method according to any one of the first aspect or the possible implementations, for example, include a processing module and a transceiver module. For example, the transceiver module may include a sending module and a receiving module. The sending module and the receiving module may be different functional modules, or may be a same functional module, but can implement different functions (the sending module is configured to implement a signal sending function, and the receiving module is configured to implement a signal receiving function). For example, the first communications apparatus is a communications device, or is a chip or another component disposed in the communications device. For example, the communications device is a terminal device or a vehicle-mounted module. For example, the first communications apparatus may be a vehicle-mounted module, or may be a chip or another component disposed in the vehicle-mounted module. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module, but can implement different functions (the transmitter is configured to implement a signal sending function, and the receiver is configured to implement a signal receiving function). If the first communications apparatus is a communications device, the transceiver is implemented, for example, as an antenna, a feeder, and a codec in the communications device. Alternatively, if the first communications apparatus is the chip disposed in the communications device, the transceiver (or the transmitter and the receiver) is, for example, a communications interface (or an interface circuit) in the chip, and the communications interface is connected to a radio frequency transceiver component in the communications device, to implement information receiving and sending by using the radio frequency transceiver component. When describing the third aspect in the present application, it will be appreciated that the phrases such as "processing module" and "transceiver module" as used herein may encompass these various aforementioned implementations of the third aspect.

The processing module is configured to send first signaling on a first resource by using the transceiver module, where the first signaling is used to indicate N communications apparatuses, and N is an integer greater than or equal to 1.

The processing module is further configured to send second signaling on a second resource by using the transceiver module, where the second signaling is used to schedule the N communications apparatuses to send or receive first data, and the first resource has an association relationship with the second resource.

Alternatively, the processing module is configured to generate first signaling, where the first signaling is used to indicate N communications apparatuses, and N is an integer greater than or equal to 1.

The transceiver module is configured to send the first signaling on a first resource.

The processing module is further configured to generate second signaling, where the second signaling is used to schedule the N communications apparatuses to send or receive first data.

The transceiver module is further configured to send the second signaling on a second resource, where the first resource has an association relationship with the second resource.

In an optional implementation, details are as follows:

The processing module is further configured to send third signaling on a third resource by using the transceiver module, where the third signaling is used to indicate M communications apparatuses, and M is an integer greater than or equal to 1.

The processing module is further configured to send a first signal on a fourth resource by using the transceiver module, where the first signal includes at least one of second data, first higher layer signaling, or a reference signal, the third resource and the first resource belong to a first group of resources, the second resource and the fourth resource belong to a second group of resources, resources included in the first group of resources are in one-to-one association with resources included in the second group of resources, and the third resource has an association relationship with the fourth resource.

Alternatively, the processing module is further configured to generate third signaling, where the third signaling is used to indicate M communications apparatuses, and M is an integer greater than or equal to 1.

The transceiver module is further configured to send the third signaling on a third resource.

The processing module is further configured to generate a first signal, where the first signal includes at least one of second data, first higher layer signaling, or a reference signal.

The transceiver module is further configured to send the first signal on a fourth resource, where the third resource and the first resource belong to a first group of resources, the second resource and the fourth resource belong to a second group of resources, resources included in the first group of resources are in one-to-one association with resources included in the second group of resources, and the third resource has an association relationship with the fourth resource.

In an optional implementation, the processing module is further configured to receive first feedback information from a second communications apparatus in the N communications apparatuses by using the transceiver module, where the first feedback information is used to indicate that the first signal is successfully received or fails to be received; or the transceiver module is further configured to receive first feedback information from a second communications apparatus in the N communications apparatuses, where the first feedback information is used to indicate that the first signal is successfully received or fails to be received.

In an optional implementation, the reference signal is used to implement one or more of the following functions:
  time synchronization;
  frequency synchronization;
  phase tracking;
  channel quality detection;
  channel estimation; or
  interference measurement.

In an optional implementation, details are as follows:
The association relationship between the first resource and the second resource is pre-configured.

Alternatively, the processing module is further configured to send fourth signaling by using the transceiver module, where the fourth signaling is used to indicate the association relationship between the first resource and the second resource; or the transceiver module is further configured to send fourth signaling, where the fourth signaling is used to indicate the association relationship between the first resource and the second resource.

In an optional implementation, that the first signaling indicates N communications apparatuses includes:
The first signaling includes identifiers of the N communications apparatuses.

Alternatively, scrambling codes used to scramble the first signaling are first scrambling codes, and the first scrambling codes correspond to the N communications apparatuses.

In an optional implementation, the first signaling is physical layer signaling.

In an optional implementation, the second signaling is high layer signaling.

In an optional implementation, the second signaling further includes type information of the second signaling and/or data amount information of the second signaling.

In an optional implementation, the first signaling further includes one or more types of the following information:
  an MCS of the second signaling;
  type information of the second signaling;
  priority information of the second signaling; or
  data amount information of the second signaling.

In an optional implementation, the first data is scheduled in a semi-persistent scheduling manner.

In an optional implementation, the second signaling includes one or more types of the following information:
  time domain resource information and/or frequency domain resource information used to send or receive the first data;
  an MCS of the first data;
  type information of the first data; or
  power control information used to send the first data.

In an optional implementation, the processing module is further configured to: send or receive the first data by using the transceiver module; or the transceiver module is further configured to: send or receive the first data.

In an optional implementation, the processing module is further configured to receive second feedback information from the second communications apparatus in the N communications apparatuses by using the transceiver module, where the second feedback information is used to indicate that the second signaling is successfully received or fails to be received; or the transceiver module is further configured to receive second feedback information from the second communications apparatus in the N communications apparatuses, where the second feedback information is used to indicate that the second signaling is successfully received or fails to be received.

In an optional implementation, details are as follows:
The processing module is further configured to send fifth signaling on a fifth resource by using the transceiver module, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

Alternatively, the transceiver module is further configured to send fifth signaling on a fifth resource, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

In an optional implementation, that the fifth signaling is used to indicate not to schedule any communications apparatus to receive a signal on a sixth resource includes:
The fifth signaling includes a first identifier, and the first identifier is not an identifier of any communications apparatus or communications apparatus group.

For technical effects brought by the third aspect or some optional implementations of the third aspect, refer to descriptions of technical effects brought by the first aspect or the corresponding implementations.

According to a fourth aspect, a communications apparatus is provided. For example, the communications apparatus is the second communication apparatus described above. The second communications apparatus is configured to perform the method according to any one of the second aspect or the possible implementations. Specifically, the second communications apparatus may include modules configured to perform the method according to any one of the second aspect or the possible implementations, for example, include a processing module and a transceiver module. For example, the transceiver module may include a sending module and a receiving module. The sending module and the receiving module may be different functional modules, or may be a same functional module, but can implement different functions (the sending module is configured to implement a signal sending function, and the receiving module is configured to implement a signal receiving function). For example, the second communications apparatus is a communications device, or is a chip or another component disposed in the communications device. For example, the communications device is a network device (for example, an access network device), a terminal device, or a vehicle-mounted module. For example, the second communications apparatus may be a vehicle-mounted module, or may be a chip or another component disposed in the vehicle-mounted module. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module, but can implement different functions (the transmitter is configured to implement a signal sending function, and the receiver is configured to implement a signal receiving function). If the second communications apparatus is a communications device, the transceiver is implemented, for example, as an antenna, a feeder, and a codec in the communications device. Alternatively, if the second communications apparatus is the chip disposed in the communications device, the transceiver (or the transmitter and the receiver) is, for example, a communications interface (or an interface circuit) in the chip, and the communications interface is connected to a radio frequency transceiver component in the communications device, to implement information receiving and sending by using the radio frequency transceiver component. When describing the fourth aspect in the present application, it will be appreciated that the phrases such as "processing module" and "transceiver module" as used herein may encompass these various aforementioned implementations of the fourth aspect.

The processing module is configured to receive first signaling on a first resource by using the transceiver module, where the first signaling is used to indicate N communications apparatuses, and N is an integer greater than or equal to 1.

The processing module is further configured to: determine that the N communications apparatuses include the second communications apparatus, and receive, by using the transceiver module, second signaling on a second resource that has an association relationship with the first resource, where the second signaling is used to schedule the N communications apparatuses to send or receive first data.

Alternatively, the transceiver module is configured to receive first signaling on a first resource, where the first signaling is used to indicate N communications apparatuses, and N is an integer greater than or equal to 1.

The processing module is configured to determine that the N communications apparatuses include the second communications apparatus.

The transceiver module is further configured to receive second signaling on a second resource that has an association relationship with the first resource, where the second signaling is used to schedule the N communications apparatuses to send or receive first data.

In an optional implementation, details are as follows:

The processing module is further configured to receive third signaling on a third resource by using the transceiver module, where the third signaling is used to indicate M communications apparatuses, and M is an integer greater than or equal to 1.

The processing module is further configured to: determine that the M communications apparatuses include the second communications apparatus, and receive, by using the transceiver module, a first signal on a fourth resource that has an association relationship with the third resource, where the first signal includes at least one of second data, first higher layer signaling, or a reference signal, the third resource and the first resource belong to a first group of resources, the second resource and the fourth resource belong to a second group of resources, and resources included in the first group of resources are in one-to-one association with resources included in the second group of resources.

Alternatively, the transceiver module is further configured to receive third signaling on a third resource, where the third signaling is used to indicate M communications apparatuses, and M is an integer greater than or equal to 1.

The processing module is further configured to determine that the M communications apparatuses include the second communications apparatus.

The transceiver module is further configured to receive a first signal on a fourth resource that has an association relationship with the third resource, where the first signal includes at least one of second data, first higher layer signaling, or a reference signal, the third resource and the first resource belong to a first group of resources, the second resource and the fourth resource belong to a second group of resources, and resources included in the first group of resources are in one-to-one association with resources included in the second group of resources.

In an optional implementation, the processing module is further configured to send first feedback information to the first communications apparatus by using the transceiver module, where the first feedback information is used to indicate that the first signal is successfully received or fails to be received; or the transceiver module is further configured to send first feedback information to the first communications apparatus, where the first feedback information is used to indicate that the first signal is successfully received or fails to be received.

In an optional implementation, the reference signal is used to implement one or more of the following functions:
  time synchronization;
  frequency synchronization;
  phase tracking;
  channel quality detection;
  channel estimation; or
  interference measurement.

In an optional implementation, details are as follows:

The association relationship between the first resource and the second resource is pre-configured.

Alternatively, the processing module is further configured to receive fourth signaling by using the transceiver module, where the fourth signaling is used to indicate the association relationship between the first resource and the second resource; or the transceiver module is further configured to receive fourth signaling, where the fourth signaling is used to indicate the association relationship between the first resource and the second resource.

In an optional implementation, that the first signaling indicates N communications apparatuses includes:

The first signaling includes identifiers of the N communications apparatuses.

Alternatively, scrambling codes used to scramble the first signaling are first scrambling codes, and the first scrambling codes correspond to the N communications apparatuses.

In an optional implementation, the first signaling is physical layer signaling.

In an optional implementation, the second signaling is high layer signaling.

In an optional implementation, the second signaling further includes type information of the second signaling and/or data amount information of the second signaling.

In an optional implementation, the first signaling further includes one or more types of the following information:
- an MCS of the second signaling;
- type information of the second signaling;
- priority information of the second signaling; or
- data amount information of the second signaling.

In an optional implementation, the first data is scheduled in a semi-persistent scheduling manner.

In an optional implementation, the second signaling includes one or more types of the following information:
- time domain resource information and/or frequency domain resource information used to send or receive the first data;
- an MCS of the first data;
- type information of the first data; or
- power control information used to send the first data.

In an optional implementation, the processing module is further configured to: send or receive the first data by using the transceiver module; or the transceiver module is further configured to: send or receive the first data.

In an optional implementation, the processing module is further configured to send second feedback information to a first communications apparatus by using the transceiver module, where the second feedback information is used to indicate that the second signaling is successfully received or fails to be received; or the transceiver module is further configured to send second feedback information to a first communications apparatus, where the second feedback information is used to indicate that the second signaling is successfully received or fails to be received.

In an optional implementation, details are as follows:

The processing module is further configured to receive fifth signaling on a fifth resource by using the transceiver module, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

The processing module is further configured to skip performing detection on the sixth resource that has the association relationship with the fifth resource.

Alternatively, the transceiver module is further configured to receive fifth signaling on a fifth resource, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

The processing module is further configured to skip performing detection on the sixth resource that has the association relationship with the fifth resource.

In an optional implementation, that the fifth signaling is used to indicate not to schedule any communications apparatus to receive a signal on a sixth resource includes:

The fifth signaling includes a first identifier, and the first identifier is not used to indicate any communications apparatus or communications apparatus group.

For technical effects brought by the fourth aspect or the optional implementations, refer to descriptions of technical effects brought by the second aspect or the corresponding implementations.

According to a fifth aspect, a communications apparatus is provided. The communications apparatus is, for example, the first communications apparatus described above. The communications apparatus includes a processor and a communications interface (or an interface circuit). The communications interface may be configured to communicate with another apparatus or device. Optionally, the communications apparatus may further include a memory, configured to store computer instructions. The processor and the memory are coupled to each other, to implement the method according to the first aspect or the possible implementations. Alternatively, the first communications apparatus may not include a memory, and the memory may be located outside the first communications apparatus. The processor, the memory, and the communications interface are coupled to each other, to implement the method according to the first aspect or the possible implementations. For example, when the processor executes the computer instructions stored in the memory, the first communications apparatus is enabled to perform the method according to any one of the first aspect or the possible implementations. For example, the first communications apparatus is a communications device, or is a chip or another component disposed in the communications device. For example, the communications device is a terminal device or a vehicle-mounted module. For example, the first communications apparatus may be a vehicle-mounted module, or may be a chip or another component disposed in the vehicle-mounted module.

If the first communications apparatus is the communications device, the communications interface is implemented, for example, as a transceiver (or a transmitter and a receiver) in the communications device, and the transceiver is implemented, for example, as an antenna, a feeder, and a codec in the communications device. Alternatively, if the first communications apparatus is the chip disposed in the communications device, the communications interface is, for example, an input/output interface such as an input/output pin of the chip. The communications interface is connected to a radio frequency transceiver component in the communications device, to receive and send information through the radio frequency transceiver component.

According to a sixth aspect, a communications apparatus is provided. The communications apparatus is, for example, the second communications apparatus described above. The communications apparatus includes a processor and a communications interface (or an interface circuit). The communications interface may be configured to communicate with another apparatus or device. Optionally, the communications apparatus may further include a memory, configured to store computer instructions. The processor and the memory are coupled to each other, to implement the method according to the second aspect or the possible implementations. Alternatively, the second communications apparatus may not include a memory, and the memory may be located outside the second communications apparatus. The processor, the memory, and the communications interface are coupled to each other, to implement the method according to the second aspect or the possible implementations. For example, when the processor executes the computer instructions stored in the memory, the second communications apparatus is enabled to perform the method according to any one of the second aspect or the possible implementations. For example, the second communications apparatus is a communications device, or is a chip or another component disposed in the communications device. For example, the communications device is a network device (for example, an access network device), a terminal device, or a vehicle-mounted module. For example, the second communications apparatus may be a vehicle-mounted module, or may be a chip or another component disposed in the vehicle-mounted module.

If the second communications apparatus is the communications device, the communications interface is implemented, for example, as a transceiver (or a transmitter and a receiver) in the communications device, and the transceiver is implemented, for example, as an antenna, a feeder, and a codec in the communications device. Alternatively, if the second communications apparatus is the chip disposed in the communications device, the communications interface is, for example, an input/output interface such as an input/output pin of the chip. The communications interface is connected to a radio frequency transceiver component in the communications device, to receive and send information through the radio frequency transceiver component.

According to a seventh aspect, a chip is provided. The chip includes a processor and a communications interface, and the processor is coupled to the communications interface, to implement the method according to any one of the first aspect or the optional implementations.

Optionally, the chip may further include a memory. For example, the processor may read and execute a software program stored in the memory, to implement the method according to any one of the first aspect or the optional implementations. Alternatively, the memory may not be included in the chip, but is located outside the chip. That is, the processor may read and execute a software program stored in an external memory, to implement the method according to any one of the first aspect or the optional implementations.

According to an eighth aspect, a chip is provided. The chip includes a processor and a communications interface, and the processor is coupled to the communications interface, to implement the method according to any one of the second aspect or the optional implementations.

Optionally, the chip may further include a memory. For example, the processor may read and execute a software program stored in the memory, to implement the method according to any one of the second aspect or the optional implementations. Alternatively, the memory may not be included in the chip, but is located outside the chip. That is, the processor may read and execute a software program stored in an external memory, to implement the method according to any one of the second aspect or the optional implementations.

According to a ninth aspect, a communications system is provided. The communications system includes the communications apparatus according to the third aspect, the communications apparatus according to the fifth aspect, or the communications apparatus according to the seventh aspect, and includes the communications apparatus according to the fourth aspect, the communications apparatus according to the sixth aspect, or the communications apparatus according to the eighth aspect.

According to a tenth aspect, a computer-readable storage medium is provided. The computer-readable storage medium is configured to store a computer program. When the computer program is run on a computer, the computer is enabled to perform the method according to any one of the first aspect or the possible implementations.

According to an eleventh aspect, a computer-readable storage medium is provided. The computer-readable storage medium is configured to store a computer program. When the computer program is run on a computer, the computer is enabled to perform the method according to any one of the second aspect or the possible implementations.

According to a twelfth aspect, a computer program product including instructions is provided. The computer program product is configured to store a computer program. When the computer program is run on a computer, the computer is enabled to perform the method according to any one of the first aspect or the possible implementations.

According to a thirteenth aspect, a computer program product including instructions is provided. The computer program product is configured to store a computer program. When the computer program is run on a computer, the computer is enabled to perform the method according to any one of the second aspect or the possible implementations.

In embodiments of this application, the first signaling needs to indicate only a corresponding communications apparatus, and does not need to include too much information, so that an information amount of the first signaling is small. When the communications apparatuses perform blind detection, because the information amount of the first signaling is small, a blind detection amount is also small. After detecting the first signaling, a communications apparatus may determine whether the communications apparatus is scheduled, so that unscheduled communications apparatuses do not need to detect the second signaling any more, to reduce invalid blind detection of these unscheduled communications apparatuses. In addition, the first resource has the association relationship with the second resource. In this case, a receive end (for example, the second communications apparatus) of the first signaling and the second signaling may determine the second resource after determining the first resource, so that the second signaling is only detected on the second resource, and blind detection does not need to be performed on too many resources. This can further reduce the blind detection amount of the communications apparatus, and simplify implementation complexity of the communications apparatus.

DESCRIPTION OF EMBODIMENTS

Figure 1A:
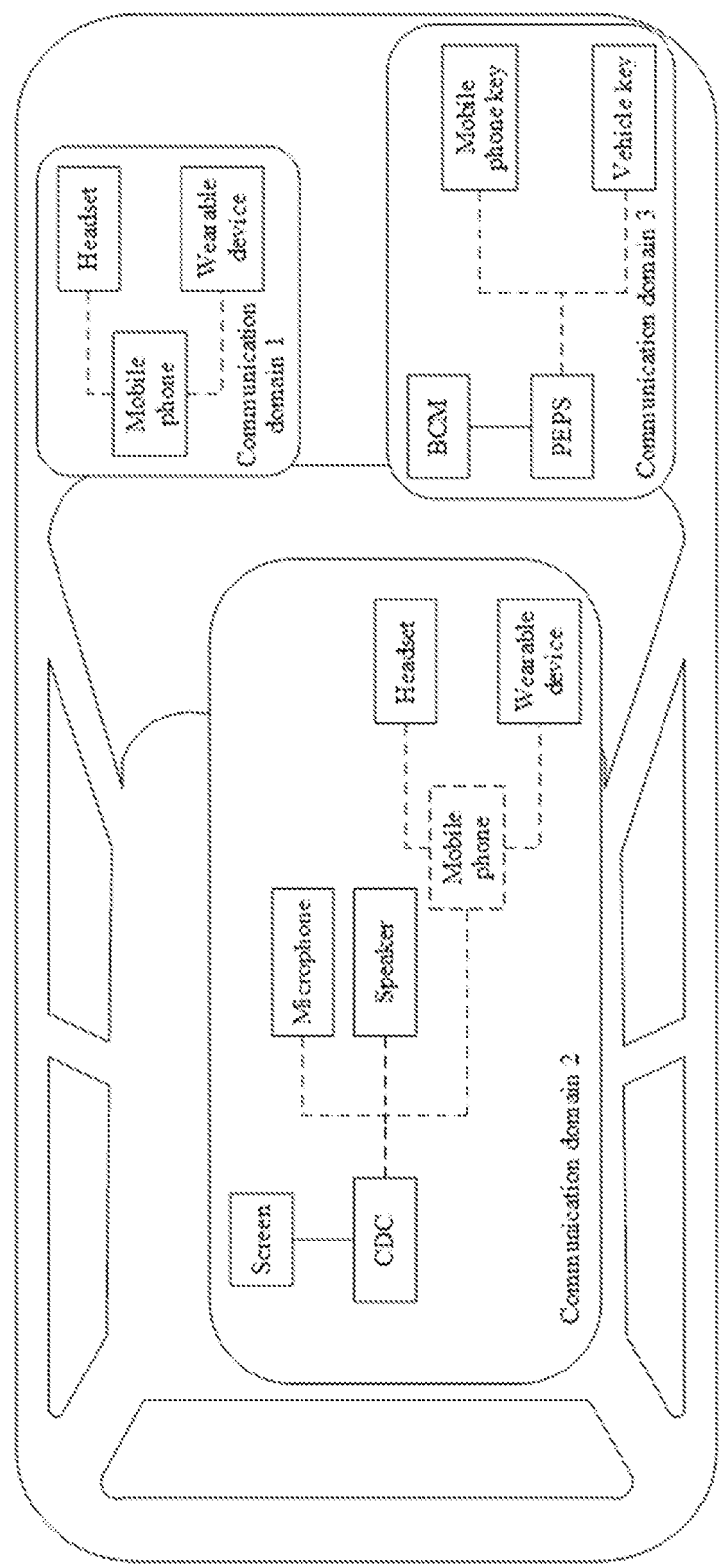
FIG. 1A is a schematic diagram of an application scenario according to an embodiment of this application.

In the specification, claims, and accompanying drawings of embodiments of this application, the terms "first", "second", "third", "fourth", and the like (if existent) are intended to distinguish between similar objects but do not necessarily indicate a specific order or sequence. It should be understood that the data termed in such a way are interchangeable in proper circumstances, so that embodiments of this application described herein can be implemented in an order other than the order illustrated or described herein. In addition, the terms "include", "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

A communications apparatus in embodiments of this application may be a vehicle-mounted device such as a head unit, a vehicle-mounted speaker, or a vehicle-mounted microphone, or may be an electronic device such as a mobile phone, a tablet computer, a desktop computer, a laptop computer, a notebook computer, an ultra-mobile personal computer (UMPC), a handheld computer, a netbook, a personal digital assistant (PDA), a wearable electronic device, or a virtual reality device. Alternatively, the communications apparatus in embodiments of this application may be a functional module, for example, a chip system, disposed in any one of the foregoing devices.

The following first describes some terms in embodiments of this application, to help a person skilled in the art have a better understanding.

(1) Cockpit domain controller (cockpit domain controller or control domain cockpit, CDC): The cockpit domain controller is briefly referred to as a head unit. In addition to conventional radio, music time-frequency playback, and navigation functions, a conventional head unit has cellular communication functions (3G, 4G, and the like), and can implement information communication between the human and a vehicle and between the vehicle and the outside world by using a controller area network (CAN) bus (BUS) technology of the vehicle. This enhances user experience, services, and safety-related functions.

(2) Master node and slave node: Two types of nodes are logically classified into the master node and the slave node. The master node manages the slave node, has a resource allocation function, and is responsible for allocating resources to the slave node. The slave node communicates, based on scheduling of the master node, with the master node by using the resources allocated by the master node. The nodes may be various apparatuses. For example, the master node is a mobile phone, the slave node is a headset. The mobile phone establishes a communication connection to the headset to implement data exchange. The mobile phone manages the headset. The mobile phone has a resource allocation function, and may allocate resources to the headset.

(3) Communication domain: The communication domain is a system including a group of communication nodes that have a communication relationship and a communication connection relationship between the communication nodes. One apparatus or device may be in a plurality of communication domains. For example, when a mobile phone performs wireless communication with a headset, the mobile phone is in a communication domain a including the mobile phone and the headset. In the communication domain a, the mobile phone is a master node, and the headset is a slave node. Then, after the mobile phone detects a CDC and establishes a wireless connection to the CDC, the mobile phone is also in a communication domain b including the mobile phone and the CDC. In the communication domain b, the CDC is a master node, and the mobile phone is a slave node. In this case, the mobile phone follows scheduling of the CDC. The communication domain b may further include other slave nodes such as a vehicle-mounted speaker and a microphone.

(4) Terms: The terms "system" and "network" may be used interchangeably in embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof means any combination of the following, including any combination of one or more of the following. For example, at least one of a, b, or c may indicate: a, b, c, a and b, a and c, b and c, or a, b, and c, where a, b, and c may be singular or plural.

In addition, unless otherwise stated, in embodiments of this application, ordinal numbers such as "first" and "second" are intended to distinguish between a plurality of objects, but are not intended to limit sizes, content, orders, time sequences, priorities, importance, or the like of the plurality of objects. For example, first signaling and second signaling are merely intended to distinguish between different signaling, and do not indicate different sizes, different content, different sending sequences, different priorities, different importance, or the like of the two pieces of signaling.

The foregoing describes concepts of some terms in embodiments of this application. The following describes technical features in embodiments of this application.

Due to diversified in-vehicle applications, there are increasingly more in-vehicle communication nodes and increasingly more types of the in-vehicle communication nodes, which imposes higher requirements on in-vehicle communication capabilities. Compared with existing wired communication, in-vehicle wireless communication can be further used to reduce a quantity of harnesses, a length of the harness, and a weight of the harness in a vehicle, and corresponding installation or maintenance costs. This makes in-vehicle communications technologies gradually develop toward wireless.

Usually, a topology relationship of an in-vehicle communication link is shown in FIG. 1A. It will be appreciated from FIG. 1A that there are a plurality of communication domains in a vehicle. One communication domain includes one master node and at least one slave node. The master node schedules the slave node, to transmit service data between the master node and the slave node. For example, in FIG. 1A, a mobile phone, a headset, and a wearable device belong to a communication domain, for example, which is referred to as a communication domain 1, where the mobile phone is a master node, and the headset and the wearable device are slave nodes; a cockpit domain controller (CDC), a display, a microphone, and a speaker belong to a communication domain, for example, which is referred to as a communication domain 2, where the CDC is a master node, and the display, the microphone, and the speaker are slave nodes; and a passive entry passive start (PEPS) system, a body control module (BCM), a mobile phone key, and a vehicle key belong to a communication domain, for example, which is referred to as a communication domain 3, where the PEPS system is a master node, and the BCM, the mobile phone key, and the vehicle key are slave nodes. In addition, a master node in a communication domain may also be used as a slave node in another communication domain. For example, the mobile phone in the communication domain 1 may be used as a slave node in the communication domain 2.

Information transmitted between the master node and the slave node may include service data, signaling, and some signals (such as a synchronization signal or a reference signal). The service data may include a type such as service data corresponding to a noise reduction service or service data corresponding to a dynamic service, and the signaling may include a type such as physical layer signaling or higher layer signaling.

The noise reduction service is a common service that needs to be supported by in-vehicle communication, and the noise reduction service may be performed in the communication domain 2 shown in FIG. 1A. The noise reduction service includes data transmission from the slave node to the master node, for example, the microphone used for noise reduction collects noise data in an environment, and sends the noise data to the CDC; and the noise reduction service further includes data transmission from the master node to the slave node, for example, after receiving the noise data, the CDC may generate data whose amplitude is the same as that of the noise data and whose phase is opposite to that of the noise data, and send the data to the speaker, to implement noise reduction. A service volume of the noise reduction service ranges from several Mbps to dozens of Mbps, or even more. The noise reduction service accounts for a high proportion of a total service volume of in-vehicle communication, and needs to be transmitted by using a large quantity of resources. In addition, the noise reduction service further has the following features:

1. A single data packet is very small. For example, valid information may be only 16 bits, 24 bits, or 32 bits.

2. A latency requirement is very high. For example, the latency requirement is approximately 20 microseconds (μs).

3. A period is stable. For example, the period is ⅛ kHz (approximately 20.83 μs).

In addition to the noise reduction service, the in-vehicle communication further needs to support transmission of service data of a small quantity of dynamic services, and is mainly used for some application layer messages (for example, messages related to a volume adjustment operation and the like) that do not have a high latency requirement, or signaling (for example, reporting a device fault) at layers above an access stratum such as a device/network layer. In addition, transmission at a physical layer further needs to support transmission of higher layer (for example, a media access control (MAC) layer) signaling, physical layer signaling, or the like at the access stratum. The dynamic service or signaling accounts for a small proportion of the total service volume of the in-vehicle communication. Transmission of the dynamic service or signaling has the following common features:

1. A size of a data packet is in orders of magnitude of dozens to hundreds of bits.

2. A latency requirement is not high (above a millisecond-level), or there is no specific latency requirement.

3. The dynamic service occurs randomly and has no obvious periodicity. Therefore, the dynamic service may be considered as a non-periodic service.

In addition, the in-vehicle communication may further support a general service such as an audio service, a video service, a web browsing service, or a file transfer service. Data packets of these services are large, and may reach hundreds to thousands of bits. Service volumes of these services account for a high proportion of the total service volume of the in-vehicle communication.

Conventionally, in a communication domain, if a slave node needs to send or receive service data, a master node needs to perform scheduling for the slave node, for example, schedule a resource used to transmit the service data. For example, in a communication domain, the master node may send scheduling signaling, to schedule the slave node to transmit the service data. A group of fixed resources are configured for each slave node in the communication domain to receive the scheduling signaling. When scheduling the slave node, the master node selects a resource from the group of resources to send the scheduling signaling, and each slave node in the communication domain blindly detects the scheduling signaling on each resource in the group of resources. The scheduling signaling may indicate information such as a scheduled resource of transmission data, an MCS of the transmission data, a type of the transmission data, and power control. It will be appreciated that the scheduling signaling includes a large amount of content and a large information amount. Each slave node in a communication domain may need to blindly detect the scheduling signaling, and a blind detection amount of the slave node is large. Consequently, implementation complexity of the node is high, and power consumption is also high.

In addition, there may be different types of scheduling signaling, for example, a dynamic scheduling type or a semi-persistent scheduling (SPS) type. Different scheduling types correspond to different scheduling signaling, and different scheduling signaling indicates different information and occupies different resources. The slave node needs to blindly detect a plurality of types of scheduling signaling. In addition, a same resource may be multiplexed by different slave nodes. In this case, the master node may implicitly indicate, by using cyclic redundancy check (CRC) or a scrambling code of the scheduling signaling, a slave node indicated by the scheduling signaling. It will be appreciated that conventionally, both sending and receiving mechanisms of the scheduling signaling are complex, and implementation complexity of the master node and the slave node is high. In addition, generally, when a same quantity of resources are used, more transmitted information indicates lower transmission reliability. It will be appreciated that conventionally, because the scheduling signaling includes a large amount of content, transmission reliability of the scheduling signaling is low.

In view of this, technical solutions in embodiments of this application are provided. In embodiments of this application, a two-level scheduling manner may be implemented. First signaling needs to indicate only a corresponding communications apparatus, and does not need to include too much information, so that an information amount of the first signaling is small. In addition, because the first signaling has indicated the corresponding communications apparatus, second signaling does not need to indicate the communications apparatus any more. It will be appreciated that, as scheduling signaling, information amounts of the first signaling and the second signaling are both reduced, to improve transmission reliability of the scheduling signaling. When the communications apparatuses perform blind detection, because the information amount of the first signaling is small, a blind detection amount is also small. After detecting the first signaling, a communications apparatus may determine whether the communications apparatus is scheduled, so that unscheduled communications apparatuses do not need to detect the second signaling any more, to reduce invalid blind detection of these unscheduled communications apparatuses. In addition, a first resource has an association relationship with a second resource. In this case, a receive end (for example, a second communications apparatus) of the first signaling and the second signaling may determine the second resource after determining the first resource, so that the second signaling is only detected on the second resource, and blind detection does not need to be performed on too many resources. This can further reduce the blind detection amount of the communications apparatus, simplify implementation complexity of the communications apparatus, and further reduce power consumption of the communications apparatus.

A wireless communication scenario to which technical solutions provided in embodiments of this application are applied may include wireless wide area communication, for example, communication between a plurality of base stations and a plurality of terminal devices, where the base station is used as a master node, and the terminal device is used as a slave node. In this case, the base station allocates resources to the terminal device, and the terminal device follows scheduling of the base station. Alternatively, the wireless communication scenario may include an in-vehicle wireless communication scenario, for example, communication between a CDC and each of a vehicle-mounted speaker, a vehicle-mounted microphone, and a mobile phone, and communication between the mobile phone and a wearable device such as a headset. Alternatively, the wireless communication scenario may include wireless local area communication, for example, communication between a plurality of access points (APs) and a plurality of stations.

For example, if technical solutions provided in embodiments of this application are applied to the in-vehicle wireless communication scenario, a network architecture shown in FIG. TA may be a network architecture to which embodiments of this application are applied. If technical solutions provided in embodiments of this application are applied to another wireless wide area communication or wireless local area communication scenario, the network architecture to which embodiments of this application are applied may correspondingly change.

Figure 1B:
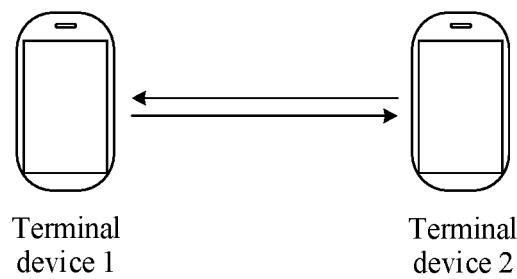
FIG. 1B is a schematic diagram of another application scenario according to an embodiment of this application.

For another example, if technical solutions provided in embodiments of this application are applied to a V2X communication scenario, FIG. 1B shows an application scenario according to an embodiment of this application. FIG. 1B includes a terminal device 1 and a terminal device 2. The terminal device 1 and the terminal device 2 may communicate with each other through a sidelink (SL).

Figure 1C:
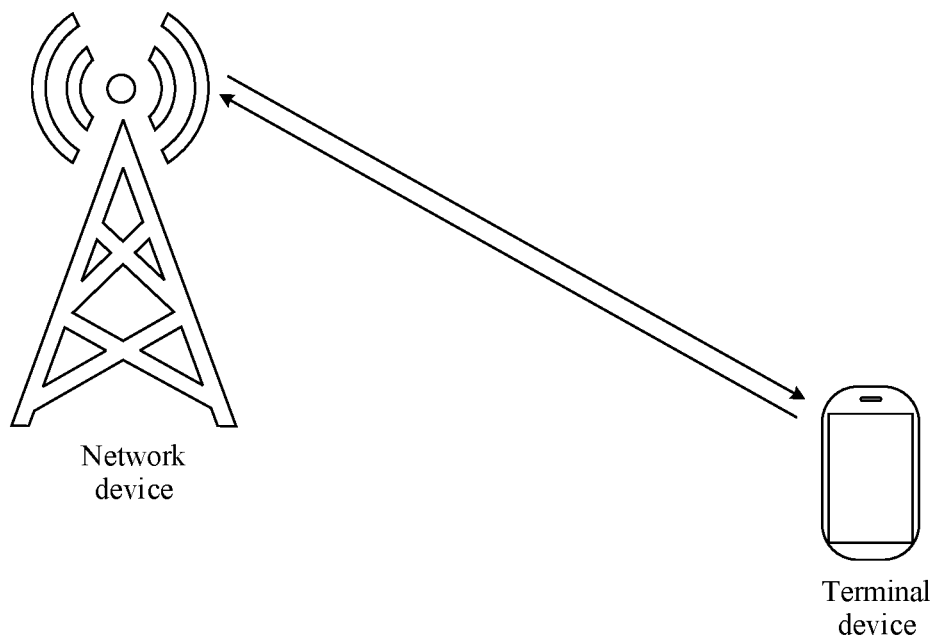
FIG. 1C is a schematic diagram of still another application scenario according to an embodiment of this application.

For another example, if technical solutions provided in embodiments of this application are applied to communication on a Uu interface in an LTE system or an NR system, FIG. 1C shows an application scenario according to an embodiment of this application. FIG. 1C includes a network device and a terminal device. The network device and the terminal device may communicate with each other through the Uu interface.

In FIG. 1B and FIG. 1C, for example, the terminal device is a mobile phone. The terminal device in embodiments of this application is not limited thereto.

The following describes, with reference to the accompanying drawings, technical solutions provided in embodiments of this application.

Figure 2:
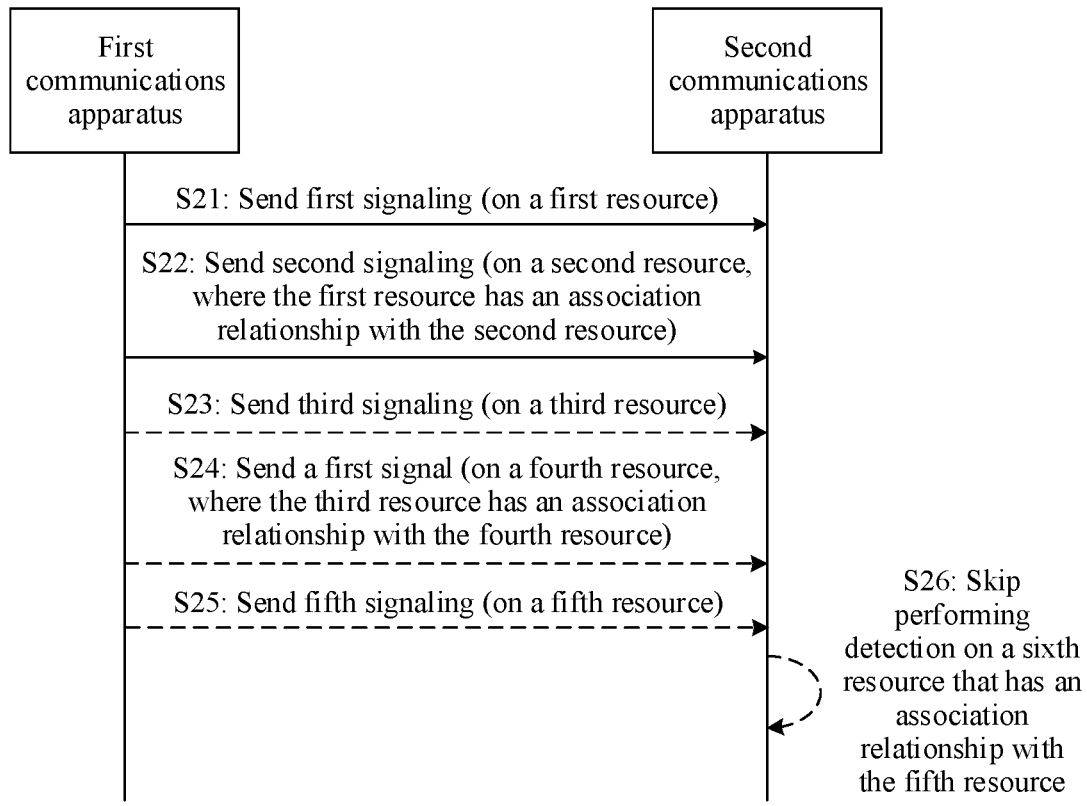
FIG. 2 is a flowchart of a scheduling method according to an embodiment of this application.

An embodiment of this application provides a scheduling method. FIG. 2 is a flowchart of the method. In the following description, an example in which the method is applied to a network architecture shown in any one of FIG. 1A to FIG. 1C is used.

For ease of description, an example in which the method is performed by a first communications apparatus and a second communications apparatus is used in the following description. If this embodiment is applied to the network architecture shown in FIG. TA, the second communications apparatus described below may be any slave node in any communication domain shown in FIG. TA, for example, the headset in the communication domain 1 or the microphone in the communication domain 2, or the second communications apparatus may be a chip system disposed in any slave node in any communication domain shown in FIG. TA; and the first communications apparatus described below may be any master node in any communication domain shown in FIG. TA, for example, the mobile phone in the communication domain 1 or the CDC in the communication domain 2, or the first communications apparatus may be a chip system disposed in any master node in any communication domain shown in FIG. TA. Alternatively, if this embodiment is applied to the network architecture shown in FIG. 1B, the first communications apparatus described below may be the terminal device 1 shown in FIG. 1B, and the second communications apparatus described below may be the terminal device 2 shown in FIG. 1B. Alternatively, if this embodiment is applied to the network architecture shown in FIG. 1C, the first communications apparatus described below may be the network device shown in FIG. 1B, and the second communications apparatus described below may be the terminal device shown in FIG. 1B.

The first communications apparatus and the second communications apparatus may be located in a same communication domain. For example, the communication domain is referred to as a first communication domain. For example, if this embodiment is applied to the network architecture shown in FIG. TA, the first communication domain may be any communication domain in the network architecture shown in FIG. TA. It should be noted that, if this embodiment is applied to the network architecture shown in FIG. TA, the first communication domain is not specifically the communication domain 1 in FIG. TA, but is any communication domain in the network architecture shown in FIG. TA.

S21: Send first signaling on a first resource. Step S21 may be performed by the first communications apparatus. At least one communications apparatus in a communication domain in which the first communications apparatus is located receives the first signaling from the first communications apparatus on the first resource. The at least one communications apparatus includes the second communications apparatus. In FIG. 2, for example, the second communications apparatus receives the first signaling. The first signaling may indicate N communications apparatuses. The N communications apparatuses may be all or some communications apparatuses except the first communications apparatus in the first communication domain, and N is an integer greater than or equal to 1.

In this embodiment of this application, a first group of resources and a second group of resources may be preset for the first communication domain. The first group of resources include at least one resource, and the second group of resources also include at least one resource. The resource included in the first group of resources has an association relationship with the resource included in the second group of resources. For example, the first group of resources may be in a one-to-one correspondence, that is, in one-to-one association, with the second group of resources. The one-to-one correspondence herein means that a unique resource in the second group of resources corresponds to any resource in the first group of resources, and a unique resource in the first group of resources corresponds to any resource in the second group of resources. For example, the first resource included in the first group of resources uniquely corresponds to a second resource in the second group of resources, and the second resource included in the second group of resources also uniquely corresponds to the first resource in the first group of resources.

Alternatively, the resource included in the first group of resources has an association relationship with the resource included in the second group of resources, and the association relationship may not be a one-to-one correspondence. For example, P resources in the second group of resources correspond to any resource in the first group of resources. In this case, the first signaling may further indicate a specific resource that is in the P resources and on which second signaling is sent, or the first signaling does not indicate a specific resource that is in the P resources and on which second signaling is sent. In this case, the N communications apparatuses may blindly detect the second signaling on the P resources. P is an integer greater than or equal to 1. In the following description in this embodiment of this application, an example in which the first group of resources are in a one-to-one correspondence with the second group of resources is mainly used.

If the first communications apparatus selects a resource (for example, a resource 1) in the first group of resources to send the first signaling, when sending information (for example, second signaling or a first signal to be described below) corresponding to the first signaling, the first communications apparatus selects a second resource that is in the second group of resources and that has an association relationship with the resource 1 to send the information. A group of resources herein is merely intended to indicate that at least one resource is included, and may be set in a form of a "group" or a "set" during setting, or may not have a concept of a "group" or a "set", and only indicates that at least one resource is set. The first group of resources, the second group of resources, the association relationship between the resources, and the like may be specified in a protocol, or may be pre-configured in a communications apparatus (for example, all or some communications apparatuses included in the first communication domain). To pre-configure corresponding information in a communications apparatus, the corresponding information may be configured in the communications apparatus when the communications apparatus is delivered from a factory, repaired, or maintained, or may be set by the first communications apparatus. If the corresponding information is set by the first communications apparatus, for example, the first communications apparatus may determine, based on performance of the first communications apparatus (for example, information processing time of the first communications apparatus), which two resources may have an association relationship, and after the setting, the first communications apparatus may send signaling to a communications apparatus other than the first communications apparatus in the first communication domain, to indicate the association relationship between the first group of resources and the second group of resources.

Optionally, the first resource includes, for example, at least one sub-resource. The at least one sub-resource may be consecutive resources in time domain, or the at least one sub-resource is inconsecutive in time domain, or at least two adjacent sub-resources in the at least one sub-resource (for example, in the at least one sub-resource, an $i^{th}$ sub-resource and an $(i+1)^{th}$ sub-resource in time domain) are inconsecutive in time domain. In addition, the at least one sub-resource may be consecutive resources in frequency domain, or the at least one sub-resource is inconsecutive in frequency domain, or at least two adjacent sub-resources in the at least one sub-resource (for example, in the at least one sub-resource, a $j^{th}$ sub-resource and a $(j+1)^{th}$ sub-resource in frequency domain) are inconsecutive in frequency domain. One or more of the second resource, a third resource, a fourth resource, a fifth resource, a sixth resource, or a seventh resource to be described below may be similar to the first resource. Alternatively, it is understood that all or some resources included in the first group of resources may be resources similar to the first resource; all or some resources included in the second group of resources may be resources similar to the first resource; and all or some resources included in a third group of resources to be described below may be resources similar to the first resource. Details are not described below.

To send the first signaling, the first communications apparatus may select a resource from the first group of resources for sending, for example, select the first resource. The first signaling is, for example, physical layer signaling, for example, downlink control information (DCI), or may be other physical layer signaling. A function of the first signaling is to enable a corresponding communications apparatus to know that the communications apparatus is scheduled. For example, if the first signaling indicates the N communications apparatuses, it indicates that the N communications apparatuses are scheduled. A processing procedure of the physical layer signaling is short, and therefore a processing speed is fast. Therefore, if the first signaling is the physical layer signaling, a corresponding communications apparatus can quickly determine whether the communications apparatus is scheduled. Alternatively, the first signaling may be other signaling, for example, higher layer signaling. This is not limited in this embodiment of this application. The higher layer signaling in this embodiment of this application is, for example, radio resource control (RRC) signaling or a MAC control element (CE).

The first signaling may implicitly or explicitly indicate the N communications apparatuses.

For example, in an implicit indication manner, different resources occupied by the first signaling indicate different communications apparatuses. For example, the first resource used to send the first signaling corresponds to the N communications apparatuses. Therefore, the first signaling can indicate the N communications apparatuses. For example, the first group of resources include a resource 1 and a resource 2, the resource 1 corresponds to a communications apparatus 1 and a communications apparatus 2, and the resource 2 corresponds to a communications apparatus 3. If the first signaling is sent by using the resource 1, it indicates that the communications apparatus 1 and the communications apparatus 2 are indicated. If the first signaling is sent by using the resource 2, it indicates that the communications apparatus 3 is indicated. In this case, if a communications apparatus detects the first signaling on the resource 1, the communications apparatus may determine that the first signaling indicates the communications apparatus 1 and the communications apparatus 2. If a communications apparatus detects the first signaling on the resource 2, the communications apparatus may determine that the first signaling indicates the communications apparatus 3.

For another example, in an implicit indication manner, different scrambling codes used to scramble the first signaling indicate different communications apparatuses. For example, scrambling codes used to scramble the first signaling are first scrambling codes, and the first scrambling codes correspond to the N communications apparatuses. Therefore, the first signaling can indicate the N communications apparatuses. For example, a scrambling code 1 corresponds to a communications apparatus 1, and a scrambling code 2 corresponds to a communications apparatus 2. In this case, if a scrambling code used to scramble the first signaling is the scrambling code 1, it indicates that the communications apparatus 1 is indicated. If a scrambling code used to scramble the first signaling is the scrambling code 2, it indicates that the communications apparatus 2 is indicated. In this case, if a communications apparatus successfully detects the first signaling by using the scrambling code 1, the communications apparatus may determine that the first signaling indicates the communications apparatus 1, and if the communications apparatus successfully detects the first signaling by using the scrambling code 2, the communications apparatus may determine that the first signaling indicates the communications apparatus 2.

For still another example, in an implicit indication manner, different CRC used by the first signaling indicate different communications apparatuses. For example, CRC of the first signaling is first CRC, and the first CRC corresponds to the N communications apparatuses. Therefore, the first signaling can indicate the N communications apparatuses. For example, CRC 1 corresponds to a communications apparatus 1, a communications apparatus 2, and a communications apparatus 3, and CRC 2 corresponds to a communications apparatus 4 and a communications apparatus 5. In this case, if CRC of the first signaling is the CRC 1, it indicates that the communications apparatus 1, the communications apparatus 2, and the communications apparatus 3 are indicated. If CRC of the first signaling is the CRC 2, it indicates that the communications apparatus 4 and the communications apparatus 5 are indicated. In this case, if a communications apparatus successfully detects the first signaling by using the CRC 1, the communications apparatus may determine that the first signaling indicates the communications apparatus 1, the communications apparatus 2, and the communications apparatus 3, and if the communications apparatus successfully detects the first signaling by using the CRC 2, the communications apparatus may determine that the first signaling indicates the communications apparatus 4 and the communications apparatus 5.

Alternatively, the first signaling may indicate the N communications apparatuses in another implicit indication manner. The foregoing description is merely an example, and does not limit the implicit indication manner. The N communications apparatuses are implicitly indicated, and the first signaling does not need to carry additional information to indicate the N communications apparatuses. This helps reduce overheads of the first signaling and reduce blind detection amounts of the N communications apparatuses. In addition, generally, when a same quantity of resources are used, less transmitted information indicates higher transmission reliability. In this case, because the first signaling does not need to carry the additional information to indicate the N communications apparatuses, that is, little information is transmitted by using the same quantity of resources, transmission reliability of the first signaling can be improved.

Alternatively, the first signaling may explicitly indicate the N communications apparatuses. For example, in an explicit indication manner, if the first signaling includes an identifier of a communications apparatus, it indicates that the communications apparatus is indicated. For example, if the first signaling includes the identifiers of the N communications apparatuses, it indicates that the N communications apparatuses are indicated. The identifier of the communications apparatus in this embodiment of this application is, for example, an identity (ID) of the communications apparatus, or may be an address of the communications apparatus in the first communication domain, or may be an identifier of a communications apparatus group to which the communications apparatus belongs. One communications apparatus group corresponds to one identifier, and one communications apparatus group may include one or more communications apparatuses. The first signaling implicitly indicates a communications apparatus. In this case, if a communications apparatus in the first communication domain fails to detect the first signaling, the communications apparatus may fail to determine whether the detection fails because the communications apparatus is not scheduled or because of a detection process. As a result, the communications apparatus may fail to determine whether to continue to detect the subsequent second signaling. This problem can be avoided in the explicit indication manner. All the communications apparatus may blindly detect the first signaling. If the first signaling includes an identifier of a communications apparatus, the communications apparatus may determine that the communications apparatus is scheduled. If the first signaling does not include an identifier of a communications apparatus, the communications apparatus may determine that the communications apparatus is not scheduled. Therefore, subsequent processing logic of the communications apparatus is clearer.

Certainly, the first signaling may alternatively indicate the N communications apparatuses in another explicit indication manner. The foregoing description is merely an example, and does not limit the explicit indication manner.

As described above, after sending the first signaling, the first communications apparatus may continue to send the second signaling. In this case, in an optional implementation, in addition to indicating the N communications apparatuses, the first signaling may further include information corresponding to the second signaling. For example, the first signaling may further include one or more of the following: an MCS of the second signaling, type information of the second signaling, priority information of the second signaling, or data amount information of the second signaling. For example, the first signaling includes the MCS of the second signaling; or the first signaling includes the MCS of the second signaling and the type information of the second signaling; or the first signaling includes the MCS of the second signaling and the data amount information of the second signaling; or the first signaling includes the priority information of the second signaling and the data amount information of the second signaling; or the first signaling includes the MCS of the second signaling, the type information of the second signaling, and the data amount information of the second signaling; or the first signaling includes the MCS of the second signaling, the priority information of the second signaling, and the data amount information of the second signaling.

The MCS of the second signaling is a modulation and coding scheme of the second signaling, and may include a modulation scheme of the second signaling, or include a coding scheme of the second signaling, or include a modulation scheme and a coding scheme of the second signaling. The coding scheme of the second signaling may include a coding type (for example, a low-density parity-check (LDPC) code or a convolutional code) of the second signaling, a bit rate of the second signaling, and/or the like. If the first signaling includes the MCS of the second signaling, the N communications apparatuses only receive the second signaling according to the MCS, and do not need to blindly detect the second signaling by using a plurality of MCSs, to reduce blind detection amounts of the N communications apparatuses. Alternatively, the first signaling may not include the MCS of the second signaling. For example, the MCS of the second signaling may be a preset MCS. The preset MCS may be specified in a protocol, or may be preset by the first communications apparatus and notified to the N communications apparatuses, or may be pre-configured in the N communications apparatuses and the first communications apparatus. In this case, the first signaling does not need to include the MCS of the second signaling, so that an information amount of the first signaling can be reduced. Because the MCS of the second signaling is known to the N communications apparatuses, the N communications apparatuses do not need to blindly detect the second signaling by using a plurality of MCSs, and blind detection amounts of the N communications apparatuses can also be reduced. Alternatively, the first signaling does not include the MCS of the second signaling, and the MCS of the second signaling is not a preset MCS. The N communications apparatuses may blindly detect the second signaling by using a plurality of possible MCSs. Even in this case, because the second resource for sending the second signaling has an association relationship with the first resource for sending the first signaling, the N communications apparatuses do not need to blindly detect the second signaling on a plurality of resources. This has greatly reduced blind detection amounts of the N communications apparatuses.

A type of the second signaling indicates, for example, one or more types of the following information: a specific type of the second signaling (for example, scheduling signaling, carrier switching signaling, or signaling used to indicate to report channel information), a scheduling type (for example, a semi-persistent scheduling type or a dynamic scheduling type) of the second signaling, or a priority of the second signaling. If the type of the second signaling indicates only the priority of the second signaling, the type information of the second signaling and the priority information of the second signaling may be considered as same information. In this case, the information may be referred to as the type information of the second signaling, or may be referred to as the priority information of the second signaling. In addition, in this case, it is considered that the first signaling may include one or more types of the following information: an MCS of the second signaling, type information of the second signaling (or priority information of the second signaling), or data amount information of the second signaling. If the first signaling indicates the type of the second signaling, the N communications apparatuses do not need to parse the second signaling in a blind detection manner, but may directly parse the second signaling. This reduces blind detection amounts of the N communications apparatuses.

Alternatively, the first signaling may not include the type information of the second signaling. For example, the type information of the second signaling may be included in the second signaling. In this manner, a data amount of the first signaling can be reduced, so that an amount of blind detection performed by the communications apparatus on the first signaling is further reduced.

Alternatively, the type information of the second signaling is jointly indicated by the first signaling and the second signaling. For example, the first signaling may include first indication information, and the second signaling may include second indication information. Therefore, the N communications apparatuses can determine the type information of the second signaling by using the first indication information and the second indication information, only parses a packet body of the second signaling based on the type information of the second signaling, and does not need to blindly detect the packet body based on a plurality of types, to reduce blind detection amounts of the N communications apparatuses.

If the first signaling indicates the data amount of the second signaling, the N communications apparatuses do not need to parse the second signaling in a blind detection manner, but may directly parse the second signaling. This also reduces blind detection amounts of the N communications apparatuses. Alternatively, the first signaling may not include the data amount information of the second signaling. For example, the data amount information of the second signaling may be included in the second signaling. In this manner, a data amount of the first signaling can be reduced, so that an amount of blind detection performed by the communications apparatus on the first signaling is further reduced.

It should be noted that blind detection on the second signaling by using the MCS is blind detection performed when the second signaling is received, and blind detection on the second signaling by using the type information or a bit size is blind detection performed when the second signaling is parsed after the second signaling is received. The two types of blind detection are different.

The first signaling may be sent in a broadcast manner, so that each communications apparatus in the first communication domain can determine, as soon as possible, whether the communications apparatus is scheduled. Certainly, the first signaling may also be sent in a unicast manner or the like. A manner of sending the first signaling is not limited in this embodiment of this application.

For example, at least one communications apparatus in the first communication domain receives the first signaling, and each of the at least one communications apparatus may determine, by parsing the first signaling, whether the first signaling includes an identifier of the communications apparatus. If a communications apparatus determines that the first signaling includes an identifier of the communications apparatus, the communications apparatus determines that the communications apparatus is scheduled, and the communications apparatus may continue to perform subsequent steps such as S22. Alternatively, if a communications apparatus determines that the first signaling does not include an identifier of the communications apparatus, the communications apparatus determines that the communications apparatus is not scheduled, and the communications apparatus does not need to perform subsequent steps such as S22. In this embodiment of this application, for example, if the N communications apparatuses determine that the first signaling includes identifiers of the N communications apparatuses, all of the N communications apparatuses may continue to perform subsequent steps such as S22. If the N communications apparatuses determine that the first signaling includes an identifier of a communications apparatus group in which the N communications apparatuses are located, the N communications apparatuses may belong to a same communications apparatus group, or may belong to a plurality of communications apparatus groups. However, manners of performing subsequent steps by the communications apparatuses are similar. Therefore, in this embodiment of this application, only an example in which the second communications apparatus in the N communications apparatuses performs the subsequent steps is used.

In this manner, some steps that need to be performed by the communications apparatus can be reduced, a blind detection amount of the communications apparatus can be reduced, implementation complexity of the communications apparatus can be simplified, and power consumption of the communications apparatus can be further reduced. Because the first signaling includes a small information amount, a blind detection amount of blindly detecting the first signaling by each communications apparatus is also small, and a power loss required for parsing the first signaling is also small. Therefore, implementation complexity of the communications apparatus can also be simplified. In addition, because the first signaling has indicated a corresponding communications apparatus, the second signaling does not need to indicate the communications apparatus any more. It will be appreciated that, as scheduling signaling, information amounts of the first signaling and the second signaling are both reduced, to improve transmission reliability of the scheduling signaling.

Considering that some communications apparatuses in the first communication domain may be communications apparatuses that require energy saving, in an optional implementation, wake-up periods may be set for these communications apparatuses that require energy saving. If a plurality of communications apparatuses in the first communication domain need to save energy, duration of wake-up periods that are set for the plurality of communications apparatuses may be the same or different. For example, if the second communications apparatus needs to save energy, a wake-up period may be set for the second communications apparatus. The wake-up period may be set by the first communications apparatus for the second communications apparatus, or the wake-up period may be specified in a protocol, or the wake-up period may be pre-configured in the second communications apparatus.

If a wake-up period is set for the second communications apparatus, the second communications apparatus may wake up in each wake-up period to detect signaling from the first communications apparatus or another communications apparatus. Beyond the wake-up period, the second communications apparatus may be in a sleep state, and does not need to detect signaling, to reduce power consumption of the second communications apparatus. For example, if the first resource is located in a wake-up period of the second communications apparatus, the second communications apparatus may detect the first resource in the wake-up period, to receive the first signaling. After receiving the first signaling, if the second communications apparatus determines that the second communications apparatus is scheduled, the second communications apparatus continues to perform detection on the second resource, and the second communications apparatus further continues to detect first data after detecting the second signaling. In this process, even if the wake-up period ends, the second communications apparatus also maintains a working state and does not enter a sleep mode, to receive corresponding information. Alternatively, after receiving the first signaling, if the second communications apparatus determines that the second communications apparatus is not scheduled, after the wake-up period ends, the second communications apparatus normally enters a sleep mode, and starts to detect signaling from another communications apparatus when a next wake-up period starts. For example, some or all resources included in the first group of resources may be periodic resources. For example, the first resource is a periodic resource, and the wake-up period of the second communications apparatus may be an integer multiple of a period of the first resource. In this way, the second communications apparatus can detect the first resource in the wake-up period.

S22: Send the second signaling on the second resource. S22 may be performed by the first communications apparatus, and the second communications apparatus receives the second signaling on the second resource. Because the first signaling indicates the N communications apparatuses, all the N communications apparatuses may receive the second signaling on the second resource. Herein, only an example in which the second communications apparatus in the N communications apparatuses receives the second signaling is used.

The second signaling may be used to schedule the N communications apparatuses to send or receive first data.

For example, the first resource belongs to the first group of resources, the second resource belongs to the second group of resources, and the first resource and the second resource are a pair of resources that have an association relationship. To be specific, if the first communications apparatus selects the first resource from the first group of resources to send the first signaling, when sending the second signaling related to the first signaling, the first communications apparatus selects, from the second group of resources, the second resource that has the association relationship with the first resource to send the second signaling. That the first signaling is related to the second signaling means that the second signaling is used to schedule the first data, and the first signaling is used to indicate a communications apparatus scheduled by using the second signaling, that is, the first signaling indicates a communications apparatus that sends or receives the first data.

The second communications apparatus in the N communications apparatuses is used as an example. The association relationship between the first resource and the second resource is known to the second communications apparatus. Therefore, the second communications apparatus may receive the second signaling on the second resource, and does not need to blindly detect the second signaling on a plurality of resources, to reduce a blind detection amount of the second communications apparatus. For example, an association relationship between the first group of resources and the second group of resources may be pre-configured in all or some communications apparatuses in the first communication domain. For example, the association relationship between the first group of resources and the second group of resources is pre-configured in both the first communications apparatus and the second communications apparatus, or the association relationship between the first group of resources and the second group of resources may be specified in a protocol. In this case, both the first communications apparatus and the second communications apparatus may learn of the association relationship between the first group of resources and the second group of resources. Because the first resource belongs to the first group of resources, and the second resource belongs to the second group of resources, the first communications apparatus and the second communications apparatus may naturally learn that the first resource has the association relationship with the second resource.

Alternatively, the association relationship between the first group of resources and the second group of resources may be set by the first communications apparatus. After the setting, the first communications apparatus may send the association relationship between the first group of resources and the second group of resources to some or all communications apparatuses except the first communications apparatus in the first communication domain. In this case, the second communications apparatus may receive the association relationship between the first group of resources and the second group of resources from the first communications apparatus. For example, the first communications apparatus may send fourth signaling in a broadcast manner. The fourth signaling may indicate the association relationship between the first group of resources and the second group of resources. In this case, some or all communications apparatuses except the first communications apparatus in the first communication domain may receive the fourth signaling from the first communications apparatus. In this way, it will be appreciated that the first resource has the association relationship with the second resource. The second communications apparatus may be one of the communications apparatuses that receive the fourth signaling.

Alternatively, the first communications apparatus may send the association relationship between the first resource and the second resource to the N communications apparatuses. To be specific, the first communications apparatus may not need to send the association relationship between the two groups of resources to the communications apparatus at a time. Because the first communications apparatus currently needs to apply the first resource and the second resource, the first communications apparatus may send only the association relationship between the first resource and the second resource to the N communications apparatuses. Similarly, for example, the first communications apparatus sends the fourth signaling, where the fourth signaling may indicate the association relationship between the first resource and the second resource. For example, the first communications apparatus sends the first signaling in a multicast manner (a receiving group is the N communications apparatuses), or may separately send the first signaling to the N communications apparatuses in a unicast manner. After receiving the fourth signaling, the N communications apparatuses may learn of the association relationship between the first resource and the second resource. In this manner, the first communications apparatus may send the association relationship between the to-be-used resources to a corresponding communications apparatus before the first group of resources and the second group of resources need to be used each time.

In an optional implementation, the first data corresponds to a first service. For example, the first data may also be referred to as second data. The first service may be a dynamic service, or may be a non-dynamic service. In this embodiment of this application, services other than the dynamic service may be collectively referred to as a non-dynamic service, and a non-dynamic service is, for example, a periodic service, for example, a noise reduction service. If the first service is the non-dynamic service, it may be understood that this embodiment of this application provides a two-level scheduling manner for the non-dynamic service. The first signaling is used for first-level scheduling, and the second signaling is used for second-level scheduling. Scheduling signaling (for example, the first signaling) corresponding to the first-level scheduling needs to indicate only a corresponding communications apparatus (for example, the first signaling indicates the N communications apparatuses), and does not need to indicate too much content, so that an information amount of the scheduling signaling corresponding to the first-level scheduling is small. Even if the communications apparatuses in the first communication domain need to blindly detect the scheduling signaling corresponding to the first-level scheduling, because the information amount is small, a blind detection amount is also small. There is an association relationship between a resource occupied by the scheduling signaling corresponding to the first-level scheduling and a resource occupied by scheduling signaling corresponding to the second-level scheduling. When detecting the scheduling signaling (for example, the second signaling) corresponding to the second-level scheduling, a scheduled node only performs detection on a corresponding resource, and does not need to perform blind detection on too many resources, to reduce a blind detection amount of the scheduled node.

If the first service is the non-dynamic service, a scheduling manner of the first service is, for example, a semi-persistent scheduling manner. If the first data corresponds to the first service, the first data may be scheduled in the semi-persistent scheduling manner. For example, if the type information of the second signaling further indicates the scheduling type of the second signaling, the scheduling type of the second signaling may be a semi-persistent scheduling type. Alternatively, although the first service is the non-dynamic service, the first service may be scheduled in another scheduling manner instead of the semi-persistent scheduling manner. Alternatively, if the first service is the dynamic service, the first service may also be scheduled in another scheduling manner instead of the semi-persistent scheduling manner. In this case, the first data is not scheduled in the semi-persistent scheduling manner. A scheduling manner of the first data is not limited in this embodiment of this application.

In a two-level scheduling process, because the first data needs to be scheduled by using the second signaling, the second signaling may include a large amount of content and is complex. Therefore, optionally, the second signaling is, for example, higher layer signaling, for example, RRC signaling or a MAC CE. The higher layer signaling has a large capacity, and may include a large amount of information. Alternatively, the second signaling may be other signaling, for example, physical layer signaling. This is not limited in this embodiment of this application.

If the second signaling is the higher layer signaling, and the second signaling includes the type information of the second signaling, the type information of the second signaling may be included in a packet header of the second signaling. The second communications apparatus may obtain the type information of the second signaling by parsing the packet header of the second signaling, so that the second communications apparatus only parses a packet body of the second signaling based on the type information of the second signaling, and does not need to blindly detect the packet body based on a plurality of types, to reduce a blind detection amount of the second communications apparatus.

Similarly, if the second signaling is the higher layer signaling, and the second signaling includes the data amount information of the second signaling, the data amount information of the second signaling may also be included in the packet header of the second signaling. The second communications apparatus may obtain the data amount information of the second signaling by parsing the packet header of the second signaling, so that the second communications apparatus only parses the packet body of the second signaling based on the data amount information of the second signaling, and does not need to blindly detect the packet body based on a plurality of possible data amounts, to reduce a blind detection amount of the second communications apparatus.

In addition, as described above, the type information of the second signaling may also be jointly indicated by the first signaling and the second signaling. In this case, if the second signaling is the higher layer signaling, the second indication information may be included in a packet header of the second signaling, so that the second communications apparatus can determine the type information of the second signaling by using the first indication information and the second indication information, only parses a packet body of the second signaling based on the type information of the second signaling, and does not need to blindly detect the packet body based on a plurality of types, to reduce a blind detection amount of the second communications apparatus.

The second signaling may be used to schedule the first data. For example, the second signaling may include one or more of the following: resource information (including time domain resource information, or frequency domain resource information, or time domain resource information and frequency domain resource information) used to send or receive the first data, an MCS of the first data, type information of the first data, or power control information used to send the first data. For example, the second signaling includes the resource used to send the first data; or the second signaling includes the resource used to send the first data and the MCS of the first data; or the second signaling includes the resource used to send the first data, the MCS of the first data, and the type information of the first data; or the second signaling includes the resource used to send the first data, the MCS of the first data, the type information of the first data, and the power control information used to send the first data. The time domain resource information used to send or receive the first data may indicate a time domain location of the resource used to send or receive the first data, and the frequency domain resource information used to send or receive the first data may indicate a frequency domain location of the resource used to send or receive the first data. In addition, the resource used to send the first data does not belong to the first group of resources described above, and does not belong to the second group of resources.

The coding scheme of the first data may include a coding type (for example, an LDPC code or a convolutional code) of the first data, a bit rate of degree data, and/or the like. The type information of the first data indicates, for example, information indicating that the first data is a data type.

If the second signaling is used to schedule the N communications apparatuses to receive the first data from the first communications apparatus, after sending the second signaling, the first communications apparatus may further send the first data to the N communications apparatuses based on the second signaling, and the N communications apparatuses may receive the first data from the first communications apparatus based on the second signaling. Alternatively, if the second signaling is used to schedule the N communications apparatuses to send the first data to the first communications apparatus, after receiving the second signaling, the N communications apparatuses may further send the first data to the first communications apparatus based on the second signaling, and the first communications apparatus may receive the first data from each of the N communications apparatuses based on the second signaling.

Optionally, after the N communications apparatuses receive the second signaling, each of some or all of the N communications apparatuses may send feedback information, for example, referred to as second feedback information, to the first communications apparatus. In this case, the first communications apparatus may receive the second feedback information from each of some or all of the N communications apparatuses, where the second feedback information may indicate that the second signaling is successfully received or fails to be received. For example, if the second communications apparatus sends the second feedback information to the first communications apparatus, the first communications apparatus may receive the second feedback information from the second communications apparatus. For example, the second feedback information is a physical layer feedback, for example, an acknowledgment (ACK) or a negative acknowledgment (NACK), or the second feedback information may be a higher layer feedback. A type of the feedback information is not limited.

Optionally, if the second signaling is used to schedule the N communications apparatuses to receive the first data, after receiving the first data, each of some or all of the N communications apparatuses may also send feedback information, for example, referred to as third feedback information, to the first communications apparatus. In this case, the first communications apparatus may receive the third feedback information from each of some or all of the N communications apparatuses, where the third feedback information may indicate that the first data is successfully received or fails to be received. For example, if the second communications apparatus sends the third feedback information to the first communications apparatus, the first communications apparatus may receive the third feedback information from the second communications apparatus. Alternatively, if the second signaling is used to schedule the N communications apparatuses to send the first data, after receiving the first data, the first communications apparatus may also send feedback information, for example, referred to as fourth feedback information, to each of some or all of the N communications apparatuses. In this case, each of some or all of the N communications apparatuses may receive the fourth feedback information from the first communications apparatus. For example, if the first communications apparatus sends the fourth feedback information to the second communications apparatus, the second communications apparatus may receive the fourth feedback information from the first communications apparatus. The fourth feedback information may indicate that the first data is successfully received or fails to be received. For example, the third feedback information or the fourth feedback information may be a physical layer feedback, for example, an ACK or a NACK, or the third feedback information or the fourth feedback information may be a higher layer feedback. A type of the feedback information is not limited.

S23: Send third signaling on a third resource. S23 may be performed by the first communications apparatus. At least one communications apparatus in a communication domain in which the first communications apparatus is located receives the third signaling from the first communications apparatus on the third resource. The at least one communications apparatus includes the second communications apparatus. In FIG. 2, for example, the second communications apparatus receives the third signaling. The third signaling may indicate M communications apparatuses. The M communications apparatuses may be all or some communications apparatuses except the first communications apparatus in the first communication domain, and M is an integer greater than or equal to 1.

The M communications apparatuses indicated by the third signaling and the N communications apparatuses indicated by the first signaling may be same communications apparatuses; or the M communications apparatuses include all or some of the N communications apparatuses, and further include a communications apparatus other than the N communications apparatuses; or the N communications apparatuses include all or some of the M communications apparatuses, and further include a communications apparatus other than the M communications apparatuses; or there is no intersection of the M communications apparatuses and the N communications apparatuses, that is, the M communications apparatuses are different from the N communications apparatuses. In this embodiment of this application, an example in which both the first signaling and the third signaling indicate the second communications apparatus is used. Therefore, an example in which there is an intersection of the M communications apparatuses and the N communications apparatuses is used.

The third resource may belong to the first group of resources. In this case, a resource, for example, a fourth resource, that has an association relationship with the third resource exists in the second group of resources. A purpose of sending the third signaling by the first communications apparatus is, for example, to send a first signal on the fourth resource, or to schedule the M communications apparatuses to receive a first signal on the fourth resource. The first signal may include one or more of the following: second data, first higher layer signaling, or a reference signal. For example, the first signal includes the second data; or the first signal includes the first higher layer signaling; or the first signal includes the reference signal; or the first signal includes the second data and the reference signal. For example, if the second data corresponds to a second service, the second data may also be referred to as second service data. The second service may be a dynamic service, or may be a non-dynamic service. The first service and the second service may be a same service. For example, both the first service and the second service are dynamic services. Alternatively, the first service and the second service may be different services. For example, the first service is a non-dynamic service, and the second service is a dynamic service. The first higher layer signaling is, for example, RRC signaling or a MAC CE. The reference signal may be used to implement one or more of the following functions: time synchronization, frequency synchronization, phase tracking, channel quality detection, channel estimation, or interference measurement. For example, the reference signal may be used to implement a time synchronization function; or the reference signal may be used to implement a frequency synchronization function; or the reference signal may be used to implement a phase tracking function; or the reference signal may be used to implement a channel quality detection function; or the reference signal may be used to implement a channel estimation function; or the reference signal may be used to implement an interference measurement function; or the reference signal may be used to implement a channel quality detection function and a channel estimation function.

For example, the second service is a dynamic service. A dynamic service, higher layer signaling, a reference signal, or the like may occur randomly and has no obvious periodicity. If the two-level scheduling mode described above is used, there may be a large amount of scheduling signaling. Therefore, in this embodiment of this application, for the dynamic service, the higher layer signaling, the reference signal, or the like, a one-level scheduling mode may be used. The third signaling may be used as scheduling signaling. After sending the scheduling signaling, the first communications apparatus may send the dynamic service, the first higher layer signaling, or the reference signal scheduled by using the scheduling signaling. The one-level scheduling manner helps reduce an amount of scheduling signaling and reduce signaling overheads. The scheduling signaling (for example, the third signaling) needs to indicate only a corresponding communications apparatus (for example, the third signaling indicates the M communications apparatuses), and does not need to indicate too much content, so that an information amount of the scheduling signaling is small. Even if the communications apparatuses in the first communication domain need to blindly detect the scheduling signaling, because the information amount is small, a blind detection amount is also small. There is an association relationship between a resource (for example, the third resource) occupied by the scheduling signaling and a resource (for example, the fourth resource) occupied by the scheduled information (for example, the first signal). When detecting the scheduled information (for example, the first signal), a scheduled communications apparatus only performs detection on a corresponding resource, and does not need to perform blind detection on too many resources, to reduce a blind detection amount of the scheduled communications apparatus.

For example, the first data is only a non-dynamic service, and is scheduled only in a semi-persistent scheduling manner, and a dynamic service (for example, the second service) is scheduled in the one-level scheduling mode. In this way, a type of the second signaling can be reduced, and scheduling signaling (for example, the second signaling) can be simplified. In addition, because a resource that can be used to transmit the first data is scheduled only in the semi-persistent scheduling manner, fragmentation of the resource that can be used to transmit the first data can also be avoided.

When the dynamic service, the higher layer signaling, or the reference signal is scheduled, although the one-level scheduling mode is used, a scheduling process is similar to a two-level scheduling process. For example, a resource may be selected from the first group of resources to send the scheduling signaling, and a corresponding resource may be selected from the second group of resources to send the first signal, so that the one-level scheduling process and the two-level scheduling process are unified, to simplify an overall data scheduling procedure. In addition, the dynamic service, the higher layer signaling, or the reference signal may multiplex a resource with second-level scheduling signaling (this means that the second group of resources may be used), to improve resource utilization.

The third signaling is, for example, physical layer signaling such as DCI, or may be other physical layer signaling. A function of the third signaling is to enable a corresponding communications apparatus to know that the communications apparatus is scheduled. For example, if the third signaling indicates the M communications apparatuses, it indicates that the M communications apparatuses are scheduled. A processing procedure of the physical layer signaling is short, and therefore a processing speed is fast. Therefore, if the third signaling is the physical layer signaling, a corresponding communications apparatus can quickly determine whether the communications apparatus is scheduled. Alternatively, the third signaling may be other signaling, for example, higher layer signaling. This is not limited in this embodiment of this application.

The third signaling may implicitly or explicitly indicate the M communications apparatuses. For a manner in which the third signaling indicates the M communications apparatuses, refer to descriptions of the manner in which the first signaling indicates the M communications apparatuses in S21.

In an optional implementation, in addition to indicating the M communications apparatuses, the third signaling may further include information corresponding to the first signal. For example, the third signaling may further include one or more of the following: an MCS of the first signal, type information of the first signal, priority information of the first signal, or data amount information of the first signal. For example, the third signaling includes the MCS of the first signal; or the third signaling includes the MCS of the first signal and the type information of the first signal; or the third signaling includes the MCS of the first signal and the data amount information of the first signal; or the third signaling includes the priority information of the first signal and the data amount information of the first signal; or the third signaling includes the MCS of the first signal, the type information of the first signal, and the data amount information of the first signal; or the third signaling includes the MCS of the first signal, the priority information of the first signal, and the data amount information of the first signal.

The MCS of the first signal is a modulation and coding scheme of the first signal, and may include a modulation scheme of the first signal, or include a coding scheme of the first signal, or include a modulation scheme and a coding scheme of the first signal. The coding scheme of the first signal may include a coding type (for example, an LDPC code or a convolutional code) of the first signal, a bit rate of the first signal, and/or the like. If the third signaling includes the MCS of the first signal, the M communications apparatuses only receive the first signal according to the MCS, and do not need to blindly detect the first signal by using a plurality of MCSs, to reduce blind detection amounts of the M communications apparatuses. Alternatively, the third signaling may not include the MCS of the first signal. For example, the MCS of the first signal may be a preset MCS. The preset MCS may be specified in a protocol, or may be preset by the first communications apparatus and notified to the M communications apparatuses, or may be pre-configured in the M communications apparatuses and the first communications apparatus. In this case, the third signaling does not need to include the MCS of the first signal, so that an information amount of the third signaling can be reduced. Because the MCS of the first signal is known to the M communications apparatuses, the M communications apparatuses do not need to blindly detect the first signal by using a plurality of MCSs, and blind detection amounts of the M communications apparatuses can also be reduced. Alternatively, the third signaling does not include the MCS of the first signal, and the MCS of the first signal is not a preset MCS. The M communications apparatuses may blindly detect the first signal by using a plurality of possible MCSs. Even in this case, because the third resource for sending the third signaling has an association relationship with the fourth resource for sending the first signal, the M communications apparatuses do not need to blindly detect the first signal on a plurality of resources. This has greatly reduced blind detection amounts of the M communications apparatuses.

A type of the first signal indicates, for example, one or more types of the following information: information indicating that the first signal is signaling, data, or a signal, where if the first signal is the signaling, a specific type of the signaling (for example, scheduling signaling, carrier switching signaling, or signaling used to indicate to report channel information) may be further indicated, a scheduling type (for example, a semi-persistent scheduling type or a dynamic scheduling type) of the first signal, or a priority of the first signal. If the type of the first signal indicates only the priority of the first signal, the type information of the first signal and the priority information of the first signal may be considered as same information. In this case, the information may be referred to as the type information of the first signal, or may be referred to as the priority information of the first signal. In addition, in this case, it is considered that the third signaling may include one or more types of the following information: an MCS of the first signal, type information of the first signal (or priority information of the first signal), or data amount information of the first signal. If the third signaling indicates the type of the first signal, the M communications apparatuses do not need to parse the first signal in a blind detection manner, but may directly parse the first signal. This reduces blind detection amounts of the M communications apparatuses.

Alternatively, the third signaling may not include the type information of the first signal. For example, the type information of the first signal may be included in the first signal. In this manner, a data amount of the third signaling can be reduced, so that an amount of blind detection performed by the communications apparatus on the third signaling is further reduced.

Alternatively, the type information of the first signal is jointly indicated by the third signaling and the first signal. For example, the third signaling may include third indication information, and the first signal may include fourth indication information. Therefore, the M communications apparatuses can determine the type information of the first signal by using the third indication information and the fourth indication information, only parses a packet body of the first signal based on the type information of the first signal, and does not need to blindly detect the packet body based on a plurality of types, to reduce blind detection amounts of the M communications apparatuses.

If the third signaling indicates the data amount of the first signal, the M communications apparatuses do not need to parse the first signal in a blind detection manner, but may directly parse the first signal. This also reduces blind detection amounts of the M communications apparatuses. Alternatively, the third signaling may not include the data amount information of the first signal. For example, the data amount information of the first signal may be included in the first signal. In this manner, a data amount of the third signaling can be reduced, so that an amount of blind detection performed by the communications apparatus on the third signaling is further reduced.

It should be noted that blind detection on the first signal by using the MCS is blind detection performed when the first signal is received, and blind detection on the first signal by using the type information or a bit size is blind detection performed when the first signal is parsed after the first signal is received. The two types of blind detection are different.

The third signaling may be sent in a broadcast manner, so that each communications apparatus in the first communication domain can determine, as soon as possible, whether the communications apparatus is scheduled. Certainly, the third signaling may also be sent in a unicast manner or the like. A manner of sending the third signaling is not limited in this embodiment of this application.

For example, at least one communications apparatus in the first communication domain receives the third signaling, and each of the at least one communications apparatus may determine, by parsing the third signaling, whether the third signaling includes an identifier of the communications apparatus. If a communications apparatus determines that the third signaling includes an identifier of the communications apparatus, the communications apparatus determines that the communications apparatus is scheduled, and the communications apparatus may continue to perform subsequent steps such as S24. Alternatively, if a communications apparatus determines that the third signaling does not include an identifier of the communications apparatus, the communications apparatus determines that the communications apparatus is not scheduled, and the communications apparatus does not need to perform subsequent steps such as S24. In this embodiment of this application, for example, if the M communications apparatuses determine that the third signaling includes identifiers of the M communications apparatuses, all of the M communications apparatuses may continue to perform subsequent steps such as S24. However, manners of performing subsequent steps by the communications apparatuses are similar. Therefore, in this embodiment of this application, only an example in which the second communications apparatus in the M communications apparatuses performs the subsequent steps is used.

In this manner, some steps that need to be performed by the communications apparatus can be reduced, implementation complexity of the communications apparatus can be simplified, and power consumption of the communications apparatus can be further reduced. Because the third signaling includes a small information amount, a blind detection amount of blindly detecting the third signaling by each communications apparatus is also small, and a power loss required for parsing the third signaling is also small. Therefore, power consumption of the communications apparatus can also be reduced.

If a wake-up period is set for the second communications apparatus based on descriptions in S21, for example, the third resource is located in a wake-up period of the second communications apparatus, the second communications apparatus may detect the third resource in the wake-up period, to receive the third signaling. After receiving the third signaling, if the second communications apparatus determines that the second communications apparatus is scheduled, the second communications apparatus continues to detect the first signal on the fourth resource. In this process, even if the fourth resource is outside the wake-up period of the second communications apparatus, when the wake-up period ends, the second communications apparatus continues to maintain a working state and does not enter a sleep mode, to detect the fourth resource. Alternatively, after receiving the third signaling, if the second communications apparatus determines that the second communications apparatus is not scheduled, after the wake-up period ends, the second communications apparatus normally enters a sleep mode, and starts to detect signaling from another communications apparatus when a next wake-up period starts.

S24: Send the first signal on the fourth resource. S24 may be performed by the first communications apparatus, and the second communications apparatus receives the first signal on the fourth resource. Because the third signaling indicates the M communications apparatuses, all the M communications apparatuses may receive the first signal on the fourth resource. Herein, only an example in which the second communications apparatus in the M communications apparatuses receives the first signal is used.

For example, the third resource belongs to the first group of resources, the fourth resource belongs to the second group of resources, and the third resource and the fourth resource are a pair of resources that have an association relationship. To be specific, if the first communications apparatus selects the third resource from the first group of resources to send the third signaling, when sending the first signal related to the third signaling, the first communications apparatus selects, from the second group of resources, the fourth resource that has the association relationship with the third resource to send the first signal. That the third signaling is related to the first signal means that the third signaling is used to schedule the first signal.

The second communications apparatus in the M communications apparatuses is used as an example. The association relationship between the third resource and the fourth resource is known to the second communications apparatus. Therefore, the second communications apparatus may receive the first signal on the fourth resource, and does not need to blindly detect the first signal on a plurality of resources, to reduce a blind detection amount of the second communications apparatus. For a manner in which the second communications apparatus learns of the association relationship between the third resource and the fourth resource, refer to descriptions of the manner in which the second communications apparatus learns of the association relationship between the first resource and the second resource in S22.

If the first signal includes the type information of the first signal, the type information of the first signal may be included in a packet header of the first signal. The second communications apparatus may obtain the type information of the first signal by parsing the packet header of the first signal, so that the second communications apparatus only parses a packet body of the first signal based on the type information of the first signal, and does not need to blindly detect the packet body based on a plurality of types, to reduce a blind detection amount of the second communications apparatus.

Similarly, if the second signaling is the higher layer signaling, and the first signal includes the data amount information of the first signal, the data amount information of the first signal may also be included in the packet header of the first signal. The second communications apparatus may obtain the data amount information of the first signal by parsing the packet header of the first signal, so that the second communications apparatus only parses the packet body of the first signal based on the data amount information of the first signal, and does not need to blindly detect the packet body based on a plurality of possible data amounts, to reduce a blind detection amount of the second communications apparatus.

In addition, as described above, the type information of the first signal may also be jointly indicated by the third signaling and the first signal. For example, the fourth indication information may be included in a packet header of the first signal, so that the second communications apparatus can determine the type information of the first signal by using the third indication information and the fourth indication information, only parses a packet body of the first signal based on the type information of the first signal, and does not need to blindly detect the packet body based on a plurality of types, to reduce a blind detection amount of the second communications apparatus.

S21 and S22 may be performed before S23 and S24, or S21 and S22 may be performed after S23 and S24, or S21 and S22 and S23 and S24 may be performed simultaneously. In addition, S23 and S24 are optional, and are represented by dashed lines in FIG. 2.

Optionally, after receiving the first signal, each of some or all of the N communications apparatuses may send feedback information, for example, referred to as first feedback information, to the first communications apparatus. In this case, the first communications apparatus may receive the first feedback information from each of some or all of the N communications apparatuses, where the first feedback information may indicate that the first signal is successfully received or fails to be received. For example, if the second communications apparatus sends the first feedback information to the first communications apparatus, the first communications apparatus may receive the first feedback information from the second communications apparatus. For example, the first feedback information is a physical layer feedback, for example, an ACK or a NACK, or the first feedback information may be a higher layer feedback. A type of the feedback information is not limited.

Figure 3:
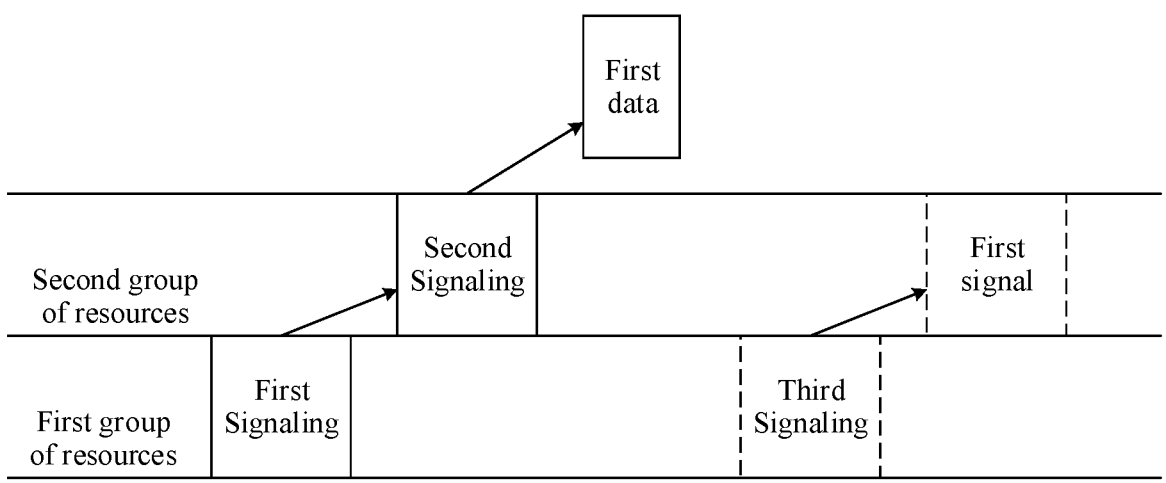
FIG. 3 is a schematic diagram of a two-level scheduling process and a one-level scheduling process according to an embodiment of this application.

For example, FIG. 3 shows an example of a two-level scheduling process and a one-level scheduling process according to an embodiment of this application. For example, in the two-level scheduling process, if the first communications apparatus sends the first signaling on the first resource included in the first group of resources, the first communications apparatus sends the second signaling on the second resource that is included in the second group of resources and that has the association relationship with the first resource, where the second signaling may be used to schedule the first data. For example, in the one-level scheduling process, if the first communications apparatus sends the third signaling on the third resource included in the first group of resources, the first communications apparatus sends the first signal on the fourth resource that is included in the second group of resources and that has the association relationship with the third resource.

S25: Send fifth signaling on a fifth resource. S25 may be performed by the first communications apparatus. At least one communications apparatus in a communication domain in which the first communications apparatus is located receives the fifth signaling from the first communications apparatus on the fifth resource. The at least one communications apparatus includes the second communications apparatus. In FIG. 2, for example, the second communications apparatus receives the fifth signaling. The fifth signaling may indicate not to schedule any communications apparatus to receive a signal on a sixth resource, or the fifth signaling indicates not to schedule any communications apparatus to receive a signal on a sixth resource, that is, no communications apparatus in the first communication domain is scheduled by using the fifth signaling.

The fifth resource may belong to the first group of resources. In this case, a resource, for example, the sixth resource, that has an association relationship with the fifth resource exists in the second group of resources. If the fifth signaling is used to schedule a corresponding communications apparatus to receive a signal, the scheduled communications apparatus may receive the signal on the sixth resource. However, the fifth signaling indicates not to schedule any communications apparatus to receive a signal on the sixth resource. In this case, any communications apparatus that receives the fifth signaling in the first communication domain may not need to detect the sixth resource. In this case, the sixth resource is not scheduled. Optionally, one or more communications apparatuses that receive the fifth signaling in the first communication domain may perform an operation such as interference listening by using the sixth resource.

There may be a plurality of implementations in which the fifth signaling is used to indicate not to schedule any communications apparatus to receive a signal on the sixth resource. For example, in an implementation, the fifth signaling includes a first identifier, and the first identifier is not used to indicate any communications apparatus or communications apparatus group (which may be understood as a plurality of communications apparatuses), or it is understood that the first identifier is not an identifier of any communications apparatus or communications apparatus group. The first identifier is, for example, an identifier of a communications apparatus, for example, an ID of the communications apparatus. However, the first identifier may be a default identifier, or the first identifier is a reserved identifier. This may mean that the communications apparatus indicated by the first identifier does not exist, or does not exist in at least the first communication domain. Alternatively, the first identifier is, for example, an identifier of a communications apparatus group, for example, an ID of the communications apparatus group. However, the first identifier may be a default identifier, or the first identifier is a reserved identifier. This may mean that the communications apparatus group indicated by the first identifier does not exist, or does not exist in at least the first communication domain. Therefore, a communications apparatus that receives the fifth signaling may determine that the fifth signaling indicates not to schedule any communications apparatus or communications apparatus group to receive a signal on the sixth resource, or may determine that the fifth signaling indicates not to schedule the communications apparatus to receive a signal on the sixth resource.

For another example, in another implementation, the fifth signaling does not include an identifier of a communications apparatus. Because the fifth signaling does not include the identifier of the communications apparatus, a communications apparatus that receives the fifth signaling may determine that the fifth signaling indicates not to schedule any communications apparatus to receive a signal on the sixth resource, or may determine that the fifth signaling indicates not to schedule the communications apparatus to receive a signal on the sixth resource.

After receiving the fifth signaling, a communications apparatus determines that the fifth signaling indicates not to schedule any communications apparatus to receive a signal, or may determine that the fifth signaling indicates not to schedule the communications apparatus to receive a signal, and the communications apparatus may determine that the fifth resource has an association relationship with the sixth resource. Therefore, it may also be considered that the communications apparatus determines that the fifth signaling indicates not to schedule any communications apparatus to receive a signal on the sixth resource, or determines that the fifth signaling indicates not to schedule the communications apparatus to receive a signal on the sixth resource.

Optionally, a third group of resources may be further set, and there may also be a correspondence between the third group of resources and the first group of resources. For a manner of the correspondence between the first group of resources and the third group of resources, refer to the foregoing descriptions of the manner of the correspondence between the first group of resources and the second group of resources. In this case, the fifth signaling may indicate not to schedule any communications apparatus to receive a signal on the sixth resource, or may indicate not to schedule any communications apparatus to send a signal on a seventh resource (or the fifth signaling indicates not to schedule any communications apparatus to send a signal on a seventh resource, that is, no communications apparatus in the first communication domain is scheduled by using the fifth signaling). The fifth resource belongs to the first group of resources. In this case, a resource, for example, the seventh resource, that has an association relationship with the fifth resource exists in the third group of resources. If the fifth signaling is used to schedule a corresponding communications apparatus to send a signal, the scheduled communications apparatus may send the signal on the seventh resource. However, the fifth signaling indicates not to schedule any communications apparatus to send a signal on the seventh resource. In this case, any communications apparatus that receives the fifth signaling in the first communication domain may not need to send a signal by using the seventh resource. In this case, the seventh resource is not scheduled. Optionally, one or more communications apparatuses that receive the fifth signaling in the first communication domain may perform an operation such as interference listening by using the seventh resource.

The fifth signaling is used to indicate not to schedule any communications apparatus to send a signal on the seventh resource. For a specific indication manner, refer to descriptions of the indication manner in which the fifth signaling indicates not to schedule any communications apparatus to receive a signal on the sixth resource.

The fifth signaling may be sent in a broadcast manner, so that each communications apparatus in the first communication domain can receive the fifth signaling. For example, the fifth signaling is physical layer signaling, or may be higher layer signaling. The fifth signaling may be periodically sent, or may be aperiodically sent.

S26: Skip performing detection on the sixth resource that has the association relationship with the fifth resource. S26 may be performed by all of all or some communications apparatuses that receive the fifth signaling, but manners of performing S26 by all the communications apparatuses may be similar. For example, the second communications apparatus receives the fifth signaling. Therefore, an example in which S26 is performed by the second communications apparatus is used.

If a communications apparatus receives the fifth signaling, the communications apparatus may determine that the communications apparatus is not scheduled, and therefore the communications apparatus does not need to detect the sixth resource. S21 and S22 may be performed before S25 and S26, or S21 and S22 may be performed after S25 and S26, or S21 and S22 and S25 and S26 may be performed simultaneously. In addition, S25 and S26 are optional, and are represented by dashed lines in FIG. 2.

If a communications apparatus receives the fifth signaling, the communications apparatus may determine that the communications apparatus is still in a range of the first communication domain. In this sense, the fifth signaling may be considered as heartbeat information, so that the communications apparatus can determine whether the communications apparatus moves out of the range of the communication domain, and the communications apparatus can take a corresponding countermeasure. For example, for a network architecture shown in FIG. 1A, a mobile phone may be used as a slave node in a communication domain 2, and the mobile phone is held by a user and may move. For example, a master node CDC in the communication domain 2 periodically sends the fifth signaling. If the mobile phone does not detect the fifth signaling in a period or several periods, the mobile phone may determine that the mobile phone has moved out of a range of the communication domain 2. In this case, the mobile phone may re-establish a connection to the communication domain 2, or choose to establish a connection to another communication domain, or the like.

In conclusion, in embodiments of this application, a two-level scheduling manner may be implemented. The first signaling needs to indicate only a corresponding communications apparatus, and does not need to include too much information, so that an information amount of the first signaling is small. When the communications apparatuses perform blind detection, because the information amount of the first signaling is small, a blind detection amount is also small. After detecting the first signaling, each communications apparatus may determine whether the communications apparatus is scheduled, so that unscheduled communications apparatuses do not need to detect the second signaling any more, to reduce invalid blind detection of these unscheduled communications apparatuses. In addition, the first resource has the association relationship with the second resource. In this case, the second communications apparatus may determine the second resource after determining the first resource, so that the second signaling is only detected on the second resource, and blind detection does not need to be performed on too many resources. This can further reduce the blind detection amount of the communications apparatus, simplify implementation complexity of the communications apparatus, and further reduce power consumption of the communications apparatus. In addition, even in the one-level scheduling mode, resources in the two-level scheduling mode can be multiplexed, to improve resource utilization.

With reference to the accompanying drawings, the following describes apparatuses configured to implement the foregoing methods in embodiments of this application. Therefore, all the foregoing content may be used in the following embodiments. Repeated content is not described again.

Figure 4:
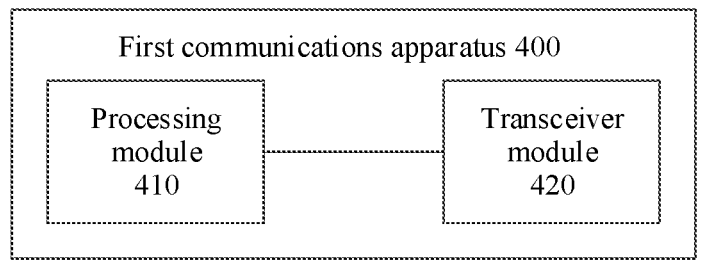
FIG. 4 is a schematic block diagram of a first communications apparatus according to an embodiment of this application.

FIG. 4 is a schematic block diagram of a first communications apparatus 400 according to an embodiment of this application.

The first communications apparatus 400 includes a processing module 410 and a transceiver module 420. For example, the first communications apparatus 400 may be a vehicle-mounted module, or may be a chip applied to the vehicle-mounted module, or another combined device or a component that has functions of the vehicle-mounted module. When the first communications apparatus 400 is the vehicle-mounted module, the transceiver module 420 may be a transceiver, and the transceiver may include an antenna, a radio frequency circuit, and the like; and the processing module 410 may be a processor, for example, a baseband processor, and the baseband processor may include one or more central processing units (CPUs). When the first communications apparatus 400 is the component that has the functions of the vehicle-mounted module, the transceiver module 420 may be a radio frequency unit, and the processing module 410 may be a processor, for example, a baseband processor. When the first communications apparatus 400 is a chip system, the transceiver module 420 may be an input/output interface of a chip (for example, a baseband chip), and the processing module 410 may be a processor of the chip system, and may include one or more central processing units. It should be understood that the processing module 410 in this embodiment of this application may be implemented by a processor or a processor-related circuit component, and the transceiver module 420 may be implemented by a transceiver or a transceiver-related circuit component.

For example, the processing module 410 may be configured to perform all operations except the receiving and sending operations performed by the first communications apparatus in the embodiment shown in FIG. 2, for example, an operation such as generating first signaling, and/or configured to support another process of the technology described in this specification. The transceiver module 420 may be configured to perform all the receiving and sending operations performed by the first communications apparatus in the embodiment shown in FIG. 2, for example, S21 to S25, and/or configured to support another process of the technology described in this specification.

In addition, the transceiver module 420 may be one functional module. The functional module can implement both a sending operation and a receiving operation. For example, the transceiver module 420 may be configured to perform all sending operations and receiving operations performed by the first communications apparatus in the embodiment shown in FIG. 2. For example, when a sending operation is performed, it may be considered that the transceiver module 420 is a sending module, and when a receiving operation is performed, it may be considered that the transceiver module 420 is a receiving module. Alternatively, the transceiver module 420 may include two functional modules. The transceiver module 420 may be considered as a general term of the two functional modules, and the two functional modules are respectively a sending module and a receiving module. The sending module is configured to implement a sending operation. For example, the sending module may be configured to perform all sending operations performed by the first communications apparatus in the embodiment shown in FIG. 2. The receiving module is configured to implement a receiving operation. For example, the receiving module may be configured to perform all receiving operations performed by the first communications apparatus in the embodiment shown in FIG. 2.

The processing module 410 is configured to send first signaling on a first resource by using the transceiver module 420, where the first signaling is used to indicate N communications apparatuses, and N is an integer greater than or equal to 1.

The processing module 410 is further configured to send second signaling on a second resource by using the transceiver module 420, where the second signaling is used to schedule the N communications apparatuses to send or receive first data, and the first resource has an association relationship with the second resource.

Alternatively, the processing module 410 is configured to generate first signaling, where the first signaling is used to indicate N communications apparatuses, and N is an integer greater than or equal to 1.

The transceiver module 420 is configured to send the first signaling on a first resource.

The processing module 410 is further configured to generate second signaling, where the second signaling is used to schedule the N communications apparatuses to send or receive first data.

The transceiver module 420 is further configured to send the second signaling on a second resource, where the first resource has an association relationship with the second resource.

In an optional implementation, details are as follows:

The processing module 410 is further configured to send third signaling on a third resource by using the transceiver module 420, where the third signaling is used to indicate M communications apparatuses, and M is an integer greater than or equal to 1.

The processing module 410 is further configured to send a first signal on a fourth resource by using the transceiver module 420, where the first signal includes at least one of second data, first higher layer signaling, or a reference signal, the third resource and the first resource belong to a first group of resources, the second resource and the fourth resource belong to a second group of resources, resources included in the first group of resources are in one-to-one association with resources included in the second group of resources, and the third resource has an association relationship with the fourth resource.

Alternatively, the processing module 410 is further configured to generate third signaling, where the third signaling is used to indicate M communications apparatuses, and M is an integer greater than or equal to 1.

The transceiver module 420 is further configured to send the third signaling on a third resource.

The processing module 410 is further configured to generate a first signal, where the first signal includes at least one of second data, first higher layer signaling, or a reference signal.

The transceiver module 420 is further configured to send the first signal on a fourth resource, where the third resource and the first resource belong to a first group of resources, the second resource and the fourth resource belong to a second group of resources, resources included in the first group of resources are in one-to-one association with resources included in the second group of resources, and the third resource has an association relationship with the fourth resource.

In an optional implementation, the processing module 410 is further configured to receive first feedback information from a second communications apparatus in the N communications apparatuses by using the transceiver module 420, where the first feedback information is used to indicate that the first signal is successfully received or fails to be received; or the transceiver module 420 is further configured to receive first feedback information from a second communications apparatus in the N communications apparatuses, where the first feedback information is used to indicate that the first signal is successfully received or fails to be received.

In an optional implementation, the reference signal is used to implement one or more of the following functions:

time synchronization;

frequency synchronization;

phase tracking;

channel quality detection;

channel estimation; or interference measurement.

In an optional implementation, details are as follows:

The association relationship between the first resource and the second resource is pre-configured.

Alternatively, the processing module 410 is further configured to send fourth signaling by using the transceiver module 420, where the fourth signaling is used to indicate the association relationship between the first resource and the second resource; or the transceiver module 420 is further configured to send fourth signaling, where the fourth signaling is used to indicate the association relationship between the first resource and the second resource.

In an optional implementation, that the first signaling indicates N communications apparatuses includes:

The first signaling includes identifiers of the N communications apparatuses.

Alternatively, scrambling codes used to scramble the first signaling are first scrambling codes, and the first scrambling codes correspond to the N communications apparatuses.

In an optional implementation, the first signaling is physical layer signaling.

In an optional implementation, the second signaling is high layer signaling.

In an optional implementation, the second signaling further includes type information of the second signaling and/or data amount information of the second signaling.

In an optional implementation, the first signaling further includes one or more types of the following information:
an MCS of the second signaling;
type information of the second signaling;
priority information of the second signaling; or
data amount information of the second signaling.

In an optional implementation, the first data is scheduled in a semi-persistent scheduling manner.

In an optional implementation, the second signaling includes one or more types of the following information:
time domain resource information and/or frequency domain resource information used to send or receive the first data;
an MCS of the first data;
type information of the first data; or
power control information used to send the first data.

In an optional implementation, the processing module 410 is further configured to: send or receive the first data by using the transceiver module 420; or the transceiver module 420 is further configured to: send or receive the first data.

In an optional implementation, the processing module 410 is further configured to receive second feedback information from a second communications apparatus in the N communications apparatuses by using the transceiver module 420, where the second feedback information is used to indicate that the second signaling is successfully received or fails to be received; or the transceiver module 420 is further configured to receive second feedback information from a second communications apparatus in the N communications apparatuses, where the second feedback information is used to indicate that the second signaling is successfully received or fails to be received.

In an optional implementation, the processing module 410 is further configured to send fifth signaling on a fifth resource by using the transceiver module 420, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource; or the transceiver module 420 is further configured to send fifth signaling on a fifth resource, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

In an optional implementation, that the fifth signaling is used to indicate not to schedule any communications apparatus to receive a signal on a sixth resource includes:

The fifth signaling includes a first identifier, and the first identifier is not an identifier of any communications apparatus or communications apparatus group.

For other functions that can be implemented by the first communications apparatus 400, refer to related descriptions in the embodiment shown in FIG. 2. Details are not described again.

Figure 5:
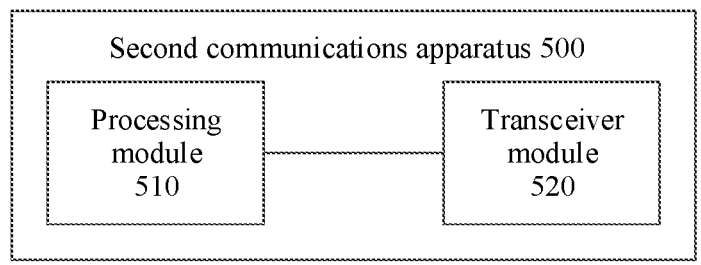
FIG. 5 is a schematic block diagram of a second communications apparatus according to an embodiment of this application.

FIG. 5 is a schematic block diagram of a second communications apparatus 500 according to an embodiment of this application.

The second communications apparatus 500 includes a processing module 510 and a transceiver module 520. For example, the second communications apparatus 500 may be a vehicle-mounted module, or may be a chip applied to the vehicle-mounted module, or another combined device or a component that has functions of the vehicle-mounted module. When the second communications apparatus 500 is the vehicle-mounted module, the transceiver module 520 may be a transceiver, and the transceiver may include an antenna, a radio frequency circuit, and the like; and the processing module 510 may be a processor, for example, a baseband processor, and the baseband processor may include one or more CPUs. When the second communications apparatus 500 is the component that has the functions of the vehicle-mounted module, the transceiver module 520 may be a radio frequency unit, and the processing module 510 may be a processor, for example, a baseband processor. When the second communications apparatus 500 is a chip system, the transceiver module 520 may be an input/output interface of a chip (for example, a baseband chip), and the processing module 510 may be a processor of the chip system, and may include one or more central processing units. It should be understood that the processing module 510 in this embodiment of this application may be implemented by a processor or a processor-related circuit component, and the transceiver module 520 may be implemented by a transceiver or a transceiver-related circuit component.

For example, the processing module 510 may be configured to perform all operations except the receiving and sending operations performed by the second communications apparatus in the embodiment shown in FIG. 2, for example, S26, and/or configured to support another process of the technology described in this specification. The transceiver module 520 may be configured to perform all the receiving and sending operations performed by the second communications apparatus in the embodiment shown in FIG. 2, for example, S21 to S25, and/or configured to support another process of the technology described in this specification.

In addition, for an implementation of the transceiver module 520, refer to descriptions of the implementation of the transceiver module 420.

The processing module 510 is configured to receive first signaling on a first resource by using the transceiver module 520, where the first signaling is used to indicate N communications apparatuses, and N is an integer greater than or equal to 1.

The processing module 510 is further configured to: determine that the N communications apparatuses include the second communications apparatus 500, and receive, by using the transceiver module 520, second signaling on a second resource that has an association relationship with the first resource, where the second signaling is used to schedule the N communications apparatuses to send or receive first data.

Alternatively, the transceiver module 520 is configured to receive first signaling on a first resource, where the first signaling is used to indicate N communications apparatuses, and N is an integer greater than or equal to 1.

The processing module 510 is configured to determine that the N communications apparatuses include the second communications apparatus 500.

The transceiver module 520 is further configured to receive second signaling on a second resource that has an association relationship with the first resource, where the second signaling is used to schedule the N communications apparatuses to send or receive first data.

In an optional implementation, details are as follows:

The processing module 510 is further configured to receive third signaling on a third resource by using the transceiver module 520, where the third signaling is used to indicate M communications apparatuses, and M is an integer greater than or equal to 1.

The processing module 510 is further configured to: determine that the M communications apparatuses include the second communications apparatus 500, and receive, by using the transceiver module 520, a first signal on a fourth resource that has an association relationship with the third resource, where the first signal includes at least one of second data, first higher layer signaling, or a reference signal, the third resource and the first resource belong to a first group of resources, the second resource and the fourth resource belong to a second group of resources, and resources included in the first group of resources are in one-to-one association with resources included in the second group of resources.

Alternatively, the transceiver module 520 is further configured to receive third signaling on a third resource, where the third signaling is used to indicate M communications apparatuses, and M is an integer greater than or equal to 1.

The processing module 510 is further configured to determine that the M communications apparatuses include the second communications apparatus 500.

The transceiver module 520 is further configured to receive a first signal on a fourth resource that has an association relationship with the third resource, where the first signal includes at least one of second data, first higher layer signaling, or a reference signal, the third resource and the first resource belong to a first group of resources, the second resource and the fourth resource belong to a second group of resources, and resources included in the first group of resources are in one-to-one association with resources included in the second group of resources.

In an optional implementation, the processing module 510 is further configured to send first feedback information to a first communications apparatus by using the transceiver module 520, where the first feedback information is used to indicate that the first signal is successfully received or fails to be received; or the transceiver module 520 is further configured to send first feedback information to a first communications apparatus, where the first feedback information is used to indicate that the first signal is successfully received or fails to be received.

In an optional implementation, the reference signal is used to implement one or more of the following functions:
time synchronization;
frequency synchronization;
phase tracking;
channel quality detection;
channel estimation; or
interference measurement.

In an optional implementation, details are as follows:

The association relationship between the first resource and the second resource is pre-configured.

Alternatively, the processing module 510 is further configured to receive fourth signaling by using the transceiver module 520, where the fourth signaling is used to indicate the association relationship between the first resource and the second resource; or the transceiver module 520 is further configured to receive fourth signaling, where the fourth signaling is used to indicate the association relationship between the first resource and the second resource.

In an optional implementation, that the first signaling indicates N communications apparatuses includes:

The first signaling includes identifiers of the N communications apparatuses.

Alternatively, scrambling codes used to scramble the first signaling are first scrambling codes, and the first scrambling codes correspond to the N communications apparatuses.

In an optional implementation, the first signaling is physical layer signaling.

In an optional implementation, the second signaling is high layer signaling.

In an optional implementation, the second signaling further includes type information of the second signaling and/or data amount information of the second signaling.

In an optional implementation, the first signaling further includes one or more types of the following information:
an MCS of the second signaling;
type information of the second signaling;
priority information of the second signaling; or
data amount information of the second signaling.

In an optional implementation, the first data is scheduled in a semi-persistent scheduling manner.

In an optional implementation, the second signaling includes one or more types of the following information:
time domain resource information and/or frequency domain resource information used to send or receive the first data;
an MCS of the first data;
type information of the first data; or
power control information used to send the first data.

In an optional implementation, the processing module 510 is further configured to: send or receive the first data by using the transceiver module 520; or the transceiver module 520 is further configured to: send or receive the first data.

In an optional implementation, the processing module 510 is further configured to send second feedback information to the first communications apparatus by using the transceiver module 520, where the second feedback information is used to indicate that the second signaling is successfully received or fails to be received; or the transceiver module 520 is further configured to send second feedback information to the first communications apparatus, where the second feedback information is used to indicate that the second signaling is successfully received or fails to be received.

In an optional implementation, details are as follows:

The processing module 510 is further configured to receive fifth signaling on a fifth resource by using the transceiver module 520, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

The processing module 510 is further configured to skip performing detection on the sixth resource that has the association relationship with the fifth resource.

Alternatively, the transceiver module 520 is further configured to receive fifth signaling on a fifth resource, where the fifth signaling is used to indicate not to schedule any communications apparatus to receive a signal on a sixth resource, the fifth resource and the first resource belong to a first group of resources, the second resource belongs to a second group of resources, resources included in the first group of resources are in one-to-one association with resources included in the second group of resources, and the second group of resources include the sixth resource that has an association relationship with the fifth resource.

The processing module 510 is further configured to skip performing detection on the sixth resource that has the association relationship with the fifth resource.

In an optional implementation, that the fifth signaling is used to indicate not to schedule any communications apparatus to receive a signal on a sixth resource includes:

The fifth signaling includes a first identifier, and the first identifier is not used to indicate any communications apparatus or communications apparatus group.

For other functions that can be implemented by the second communications apparatus 500, refer to related descriptions in the embodiment shown in FIG. 2. Details are not described again.

An embodiment of this application further provides a communications apparatus. The communications apparatus may be a terminal device, a circuit, or a vehicle-mounted module. The communications apparatus may be configured to perform an action performed by the first communications apparatus or the second communications apparatus in the foregoing method embodiments.

Figure 6:
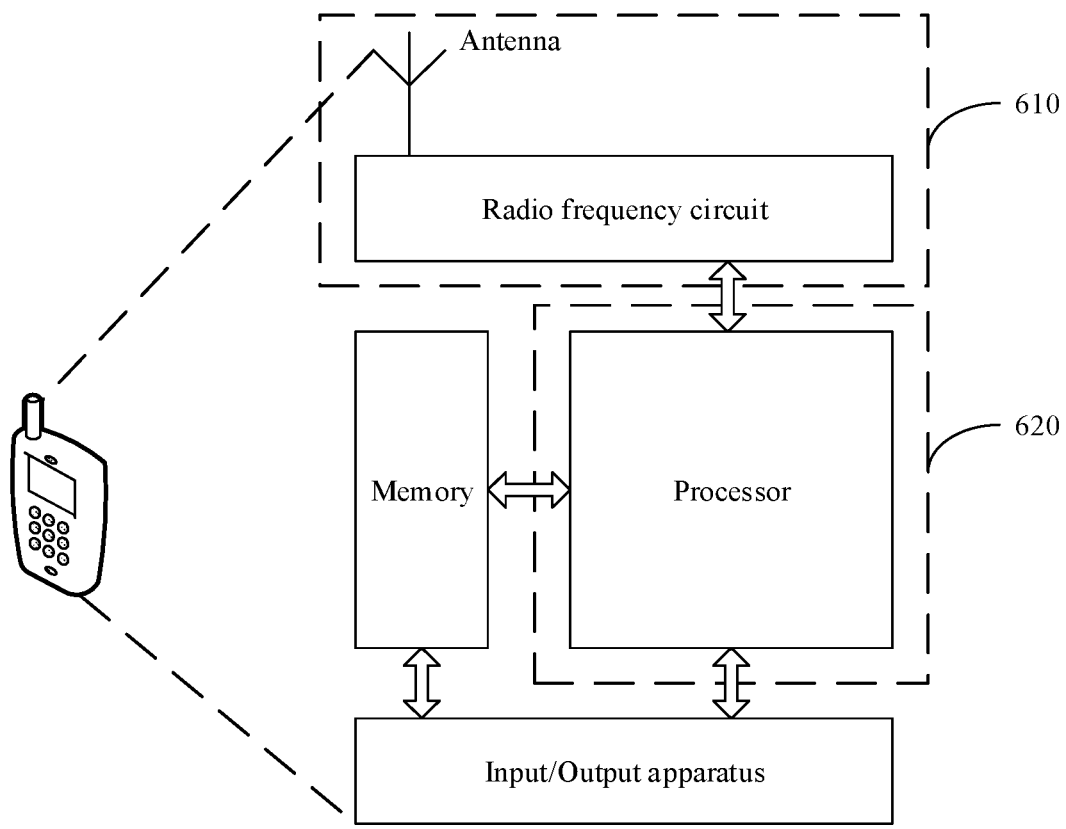
FIG. 6 is a schematic block diagram of a communications apparatus according to an embodiment of this application.

When the communications apparatus is the terminal device, FIG. 6 is a simplified schematic diagram of a structure of a terminal device. For ease of understanding and illustration, in FIG. 6, the terminal device is, for example, a mobile phone. As shown in FIG. 6, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to: receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 6 shows only one memory and one processor. An actual terminal device product may include one or more processors and one or more memories. The memory may also be referred to as a storage medium, a storage device, or the like. The memory may be disposed independent of the processor, or may be integrated into the processor. This is not limited in this embodiment of this application.

In this embodiment of this application, the antenna and the radio frequency circuit that have receiving and sending functions may be considered as a transceiver unit of the terminal device (the transceiver unit may be one functional unit, and the functional unit can implement a sending function and a receiving function; or the transceiver unit may include two functional units: a receiving unit that can implement a receiving function and a sending unit that can implement a sending function), and the processor that has a processing function may be considered as a processing unit of the terminal device. As shown in FIG. 6, the terminal device includes a transceiver unit 610 and a processing unit 620. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 610 and that is configured to implement a receiving function may be considered as a receiving unit, and a component that is in the transceiver unit 610 and that is configured to implement a sending function may be considered as a sending unit, that is, the transceiver unit 610 includes a receiving unit and a sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 610 is configured to perform a sending operation and a receiving operation on a side of the first communications apparatus in the foregoing method embodiments, and the processing unit 620 is configured to perform an operation other than the receiving and sending operations of the first communications apparatus in the foregoing method embodiments.

For example, in an implementation, the processing unit 620 may be configured to perform all operations except the receiving and sending operations performed by the first communications apparatus in the embodiment shown in FIG. 2, for example, an operation of generating first signaling, and/or configured to support another process of the technology described in this specification. The transceiver unit 610 may be configured to perform all the receiving and sending operations performed by the first communications apparatus in the embodiment shown in FIG. 2, for example, S21 to S25, and/or configured to support another process of the technology described in this specification.

Alternatively, the transceiver unit 610 is configured to perform a sending operation and a receiving operation on a side of the second communications apparatus in the foregoing method embodiments, and the processing unit 620 is configured to perform an operation other than the receiving and sending operations of the second communications apparatus in the foregoing method embodiments.

For example, in an implementation, the processing unit 620 may be configured to perform all operations except the receiving and sending operations performed by the second communications apparatus in the embodiment shown in FIG. 2, for example, S26, and/or configured to support another process of the technology described in this specification. The transceiver unit 610 may be configured to perform all the receiving and sending operations performed by the second communications apparatus in the embodiment shown in FIG. 2, for example, S21 to S25, and/or configured to support another process of the technology described in this specification.

When the communications apparatus is a chip apparatus or circuit, the apparatus may include a transceiver unit and a processing unit. The transceiver unit may be an input/output circuit and/or a communications interface. The processing unit is an integrated processor, a microprocessor, or an integrated circuit.

Figure 7:
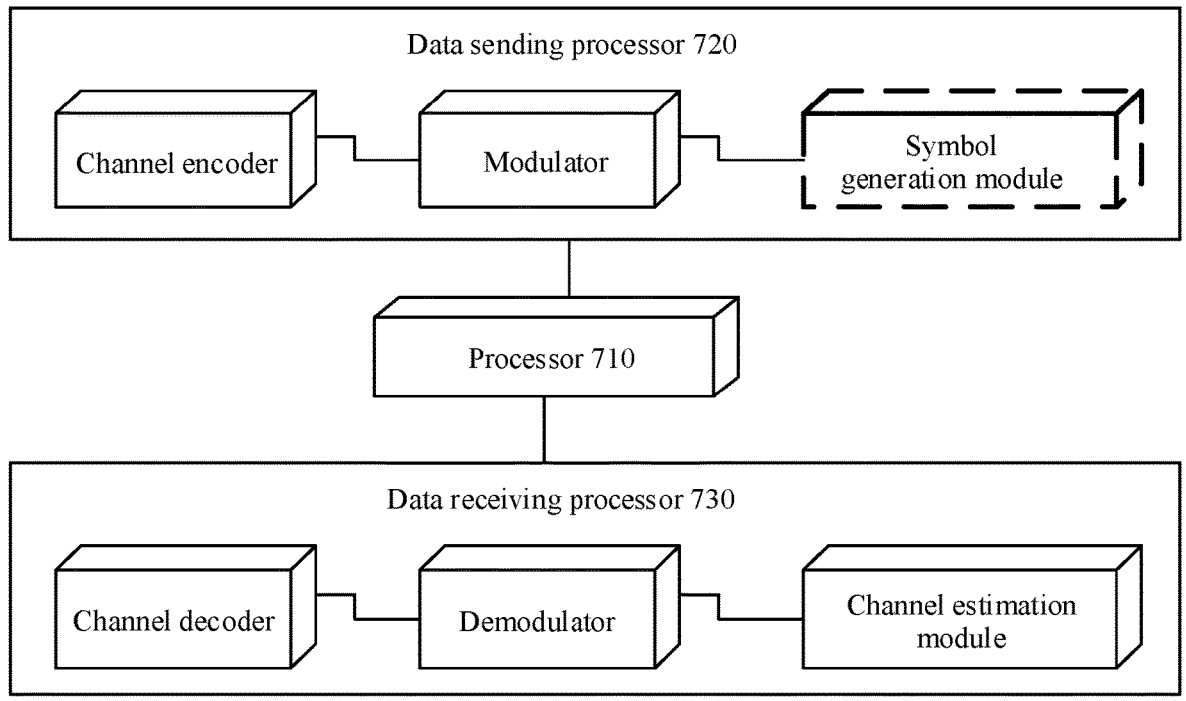
FIG. 7 is another schematic block diagram of a communications apparatus according to an embodiment of this application.

When the communications apparatus in this embodiment is a terminal device, reference may be made to a device shown in FIG. 7. For example, the device can implement functions similar to those of the processing module 410 in FIG. 4. For another example, the device can implement functions similar to those of the processing module 510 in FIG. 5. In FIG. 7, the device includes a processor 710, a data sending processor 720, and a data receiving processor 730. The processing module 410 in the foregoing embodiment may be the processor 710 in FIG. 7, and completes corresponding functions. The transceiver module 420 in the foregoing embodiment may be the data sending processor 720 and/or the data receiving processor 730 in FIG. 7, and completes corresponding functions. Alternatively, the processing module 510 in the foregoing embodiment may be the processor 710 in FIG. 7, and completes corresponding functions. The transceiver module 520 in the foregoing embodiment may be the data sending processor 720 and/or the data receiving processor 730 in FIG. 7, and completes corresponding functions. Although a channel encoder and a channel decoder are shown in FIG. 7, it may be understood that these modules do not constitute a limitation on this embodiment, and are merely examples.

Figure 8:
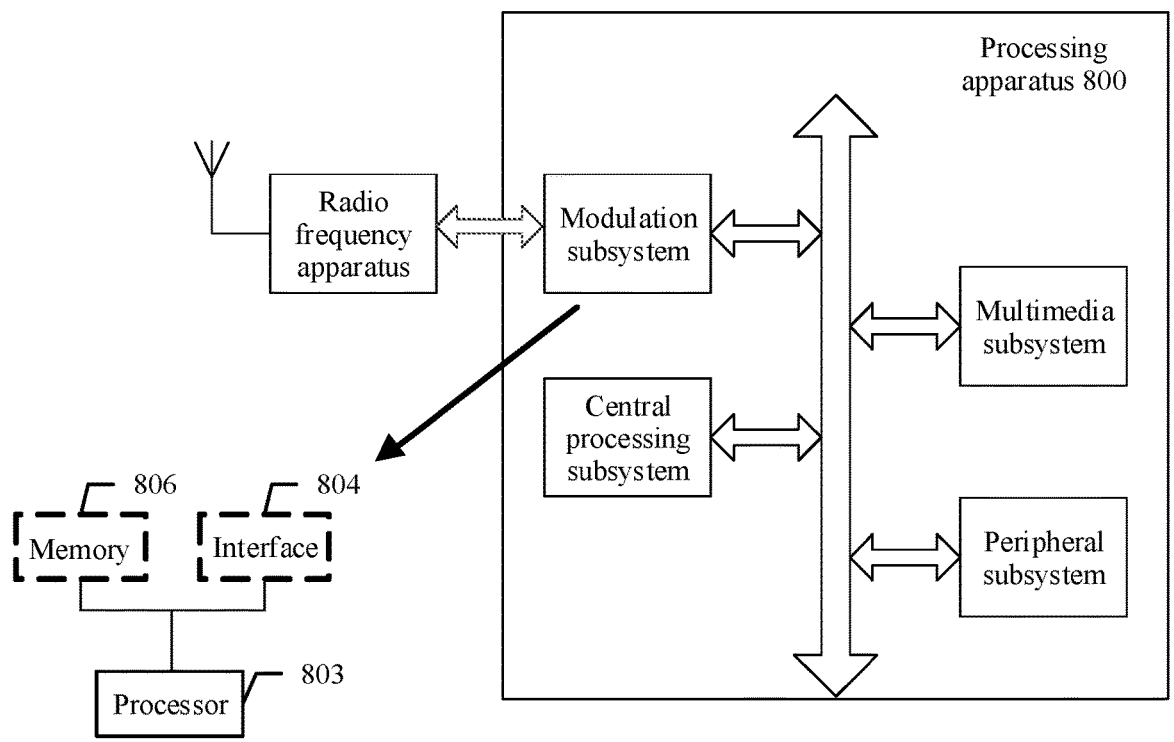
FIG. 8 is still another schematic block diagram of a communications apparatus according to an embodiment of this application.

FIG. 8 shows another form of this embodiment. A processing apparatus 800 includes modules such as a modulation subsystem, a central processing subsystem, and a peripheral subsystem. The communications apparatus in this embodiment may be used as the modulation subsystem. Specifically, the modulation subsystem may include a processor 803 and an interface 804. The processor 803 implements functions of the processing module 410, and the interface 804 implements functions of the transceiver module 420. Alternatively, the processor 803 implements functions of the processing module 510, and the interface 804 implements functions of the transceiver module 520. In another variation, the modulation subsystem includes a memory 806, a processor 803, and a program that is stored in the memory 806 and that can be run on the processor. When executing the program, the processor 803 implements the method on a side of the terminal device in the foregoing method embodiment. It should be noted that the memory 806 may be nonvolatile or volatile. The memory 806 may be located in the modulation subsystem, or may be located in the processing apparatus 800, provided that the memory 806 can be connected to the processor 803.

An embodiment of this application provides a communications system. The communications system may include the first communications apparatus in the embodiment shown in FIG. 2, and include the second communications apparatus in the embodiment shown in FIG. 2. The first communications apparatus is, for example, the first communications apparatus 400 in FIG. 4. The second communications apparatus is, for example, the second communications apparatus 500 in FIG. 5.

An embodiment of this application further provides a computer-readable storage medium. The computer-readable storage medium stores a computer program. When the computer program is executed by a computer, the computer may implement a procedure related to the first communications apparatus in the embodiment shown in FIG. 2 provided in the foregoing method embodiments.

An embodiment of this application further provides a computer-readable storage medium. The computer-readable storage medium is configured to store a computer program. When the computer program is executed by a computer, the computer may implement a procedure related to the second communications apparatus in the embodiment shown in FIG. 2 provided in the foregoing method embodiments.

An embodiment of this application further provides a computer program product. The computer program product is configured to store a computer program. When the computer program is executed by a computer, the computer may implement a procedure related to the first communications apparatus in the embodiment shown in FIG. 2 provided in the foregoing method embodiments.

An embodiment of this application further provides a computer program product. The computer program product is configured to store a computer program. When the computer program is executed by a computer, the computer may implement a procedure related to the second communications apparatus in the embodiment shown in FIG. 2 provided in the foregoing method embodiments.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that units and algorithm steps in the examples described with reference to embodiments disclosed in this specification can be implemented by electronic hardware or a combination of computer software and electronic hardware. Whether the functions are performed by hardware or software depends on particular applications and design constraints of respective technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

For the several example embodiments provided in this application, it should be understood that the disclosed systems, apparatuses, and methods may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located at one location, or may be distributed on a plurality of network units. Some or all of the units may be selected based on actual requirements to achieve objectives of solutions of respective embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application may be implemented in a form of a software product. The computer software product is stored in a storage medium, and includes several instructions for indicating a computer device (which may be a personal computer, a server, a network device, or the like) to perform all or some of the steps of the methods in embodiments of this application. The foregoing computer-readable storage medium may be any usable medium accessible by a computer. By way of example but not limitation, the computer-readable medium may include a random access memory (RAM), a read-only memory (ROM), an electrically erasable programmable read-only memory (EEPROM), a compact disc read-only memory (CD-ROM), a universal serial bus flash disk, a removable hard disk or another compact disc storage, a magnetic disk storage medium or another magnetic storage device, or any other medium that can be used to carry or store expected program code in a form of an instruction or a data structure and that can be accessed by a computer.

The foregoing descriptions are merely example implementations of this application, but are not intended to limit the protection scope of embodiments of this application. Any variation or replacement readily figured out by a person skilled in the art within the technical scope disclosed in embodiments of this application may fall within the protection scope of embodiments of this application.

What is claimed is:

1. A scheduling method, comprising:
   sending, by a first communications apparatus, indication signaling on a first resource, wherein the indication signaling indicates N communications apparatus(es), where N is an integer greater than or equal to 1; and
   sending, by the first communications apparatus, scheduling signaling on a second resource to schedule sending or receiving of first data for the N communications apparatus(es), wherein the second resource has an association relationship with the first resource which enables the N communications apparatus(es) to detect the scheduling signaling on the second resource without performing blind detection.

2. The method according to claim 1, wherein the method further comprises:
   sending, by the first communications apparatus, third signaling on a third resource, wherein the third signaling indicates M communications apparatus(es), where M is an integer greater than or equal to 1; and
   sending, by the first communications apparatus, a first signal on a fourth resource, wherein the first signal comprises at least one of second data, first higher layer signaling, or a reference signal, wherein the third resource and the first resource belong to a first group of resources, wherein the second resource and the fourth resource belong to a second group of resources, wherein resources comprised in the first group of resources have a one-to-one association with resources comprised in the second group of resources, and wherein the fourth resource is determinable according to the third resource.

3. The method according to claim 2, wherein the method further comprises:
   receiving, by the first communications apparatus, feedback information from a communications apparatus of the N communications apparatus(es), wherein the feedback information indicates whether the first signal was successfully received.

4. The method according to claim 2, wherein the reference signal is for implementing one or more of the following functions:
   time synchronization;
   frequency synchronization;
   phase tracking;
   channel quality detection;
   channel estimation; or
   interference measurement.

5. The method according to claim 1, wherein the indication signaling indicates the N communications apparatus(es) based on:
   the indication signaling comprising identifiers of the N communications apparatus(es); or scrambling codes for scrambling the indication signaling being first scrambling codes corresponding to the N communications apparatus(es).

6. The method according to claim 1, wherein the method further comprises:
receiving, by the first communications apparatus, feedback information from a communications apparatus of the N communications apparatus(es), wherein the feedback information indicates whether the scheduling signaling was successfully received.

7. The method according to claim 1, wherein the method further comprises:
sending, by the first communications apparatus, fifth signaling on a fifth resource, wherein the fifth signaling indicates not to schedule any communications apparatus to receive a signal on a sixth resource, wherein the fifth resource and the first resource belong to a first group of resources, wherein the second resource belongs to a second group of resources, wherein resources comprised in the first group of resources have a one-to-one association with resources comprised in the second group of resources, wherein the second group of resources comprises the sixth resource, and wherein the sixth resource is determinable according to the fifth resource.

8. The method according to claim 7, wherein the fifth signaling comprises a first identifier, and the first identifier is not an identifier of any communications apparatus or communications apparatus group.

9. A communications apparatus, comprising:
a memory having instructions stored thereon; and
a processor coupled to the memory;
wherein the processor is configured to execute the instructions stored on the memory to facilitate the following being performed by the communications apparatus:
sending indication signaling on a first resource, wherein the indication signaling indicates N communications apparatus(es), where N is an integer greater than or equal to 1; and
sending scheduling signaling on a second resource to schedule sending or receiving of first data for the N communications apparatus(es), wherein the second resource has an association relationship with the first resource which enables the N communications apparatus(es) to detect the scheduling signaling on the second resource without performing blind detection.

10. The communications apparatus according to claim 9, wherein the processor is further configured to execute the instructions stored on the memory to facilitate the following being performed by the communications apparatus:
sending third signaling on a third resource, wherein the third signaling indicates M communications apparatus(es), where M is an integer greater than or equal to 1; and
sending a first signal on a fourth resource, wherein the first signal comprises at least one of second data, first higher layer signaling, or a reference signal, wherein the third resource and the first resource belong to a first group of resources, wherein the second resource and the fourth resource belong to a second group of resources, wherein resources comprised in the first group of resources have a one-to-one association with resources comprised in the second group of resources, and wherein the fourth resource is determinable according to the third resource.

11. The communications apparatus according to claim 10, wherein the processor is further configured to execute the instructions stored on the memory to facilitate the following being performed by the communications apparatus:
receiving feedback information from a respective communications apparatus of the N communications apparatus(es), wherein the feedback information indicates whether the first signal was successfully received.

12. The communications apparatus according to claim 10, wherein the reference signal is for implementing one or more of the following functions:
time synchronization;
frequency synchronization;
phase tracking;
channel quality detection;
channel estimation; or
interference measurement.

13. The communications apparatus according to claim 9, wherein the indication signaling indicates the N communications apparatus(es) based on:
the indication signaling comprising identifiers of the N communications apparatus(es); or
scrambling codes for scrambling the indication signaling being first scrambling codes corresponding to the N communications apparatus(es).

14. The communications apparatus according to claim 9, wherein the processor is further configured to execute the instructions stored on the memory to facilitate the following being performed by the communications apparatus:
receiving feedback information from a respective communications apparatus of the N communications apparatus(es), wherein the feedback information indicates whether the scheduling signaling was successfully received.

15. The communications apparatus according to claim 9, wherein the processor is further configured to execute the instructions stored on the memory to facilitate the following being performed by the communications apparatus:
sending fifth signaling on a fifth resource, wherein the fifth signaling indicates not to schedule any communications apparatus to receive a signal on a sixth resource, wherein the fifth resource and the first resource belong to a first group of resources, wherein the second resource belongs to a second group of resources, wherein resources comprised in the first group of resources have a one-to-one association with resources comprised in the second group of resources, wherein the second group of resources comprise the sixth resource, and wherein the sixth resource is determinable according to the fifth resource.

16. The communications apparatus according to claim 15, wherein the fifth signaling comprises a first identifier, and the first identifier is not an identifier of any communications apparatus or communications apparatus group.

17. A communications apparatus, comprising:
a memory having instructions stored thereon; and
a processor coupled to the memory;
wherein the processor is configured to execute the instructions stored on the memory to facilitate the following being performed by the communications apparatus:
receiving indication signaling on a first resource, wherein the indication signaling indicates N communications apparatus(es), where N is an integer greater than or equal to 1;
determining that the N communications apparatus(es) comprise the communications apparatus; and
receiving scheduling signaling on a second resource to schedule sending or receiving of first data for the communications apparatus, wherein the second resource has an association relationship with the first resource which enables the communication apparatus to detect the scheduling signaling on the second resource without performing blind detection.

18. The communications apparatus according to claim 17, wherein the processor is further configured to execute the instructions stored on the memory to facilitate the following being performed by the communications apparatus:
receiving third signaling on a third resource, wherein the third signaling indicates M communications apparatus(es), where M is an integer greater than or equal to 1;
determining that the M communications apparatus(es) comprise the communications apparatus; and
receiving a first signal on a fourth resource, wherein the fourth resource is determined according to the third resource, wherein the first signal comprises at least one of second data, first higher layer signaling, or a reference signal, wherein the third resource and the first resource belong to a first group of resources, wherein the second resource and the fourth resource belong to a second group of resources, and wherein resources comprised in the first group of resources have a one-to-one association with resources comprised in the second group of resources.

19. The communications apparatus according to claim 18, wherein the processor is further configured to execute the instructions stored on the memory to facilitate the following being performed by the communications apparatus:
sending feedback information to a first communications apparatus, wherein the feedback information indicates whether the first signal was successfully received.

20. The communications apparatus according to claim 18, wherein the reference signal is for implementing one or more of the following functions:
time synchronization;
frequency synchronization;
phase tracking;
channel quality detection;
channel estimation; or
interference measurement.

* * * * *